US008095471B2

(12) United States Patent
Yang et al.

(10) Patent No.: US 8,095,471 B2
(45) Date of Patent: Jan. 10, 2012

(54) SOFTWARE LICENSING MANAGEMENT SYSTEM

(75) Inventors: Eric Yang, Cupertino, CA (US); Scott Baeder, Northborough, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 972 days.

(21) Appl. No.: 09/854,306

(22) Filed: May 11, 2001

(65) Prior Publication Data

US 2002/0169625 A1 Nov. 14, 2002

(51) Int. Cl.
*G06Q 99/00* (2006.01)
(52) U.S. Cl. .......................................................... 705/59
(58) Field of Classification Search .................... None
See application file for complete search history.

(56) References Cited

U.S. PATENT DOCUMENTS

| 3,751,670 | A | * | 8/1973 | Grodner et al. | 398/67 |
| 5,204,897 | A | * | 4/1993 | Wyman | 710/200 |
| 6,920,567 | B1 | * | 7/2005 | Doherty et al. | 726/22 |
| 2003/0040917 | A1 | * | 2/2003 | Fiedler | 704/500 |
| 2003/0126033 | A1 | * | 7/2003 | Evans et al. | 705/26 |
| 2004/0133793 | A1 | * | 7/2004 | Ginter et al. | 713/193 |
| 2006/0004665 | A1 | * | 1/2006 | Stefik et al. | 705/51 |

OTHER PUBLICATIONS

EarthWeb discontinues its ITKnowledge electronic book service, Information Intelligence Online Libraries and Micocomputers, Mar. 2001.*

Derfler, Frank J. et. al. How Networks Work, Millennium Ed., Que Corporation, Aug. 23, 2000.*
Gralla, Preston, How the Internet Works, Millennium Ed., Que Corporation, Sep. 23, 1999.*
White, How Computers Work, Millennium Ed., Que Corporation, Sep. 22, 1999.*
EDAtoolsCafe$_{SM}$, entitled "Award Winning Supermax® ECAD Product Suite Now Available Through Internet-Based EDAstore", (pp. 1-3), accessed Jun. 13, 2001, www.dacafe.com/DACafe/NEWS/EDANews/20010402edaconnect.html.

* cited by examiner

*Primary Examiner* — Andrew J. Fischer
*Assistant Examiner* — Jacob C. Coppola
(74) *Attorney, Agent, or Firm* — Holland & Knight LLP; Brian J. Colandreo, Esq.; Mark H. Whittenberger, Esq.

(57) ABSTRACT

A contract management mechanism is disclosed for managing contracts in the software licensing arena. The management mechanism may be used, for example, to manage one or more fulfillment contracts. In operation (assuming a software licensing implementation for the sake of example), the management mechanism receives an inquiry regarding licensing of a particular set of software under a particular contract (the contract entitles a customer to consume a certain quota of resources under the contract). In response to the inquiry, the management mechanism determines a licensing amount. This licensing amount may be determined based upon many factors, including the set of software selected, other parameters specified in the inquiry, and the terms associated with the contract. Once the licensing amount is determined, and the customer commits to licensing the software, the management mechanism reduces the quota parameter of the contract by the licensing amount and allows the software to be used under the contract. Licensing of the software under the fulfillment contract is thus achieved and managed. Using the same process, other sets of software may be licensed under the same contract.

140 Claims, 13 Drawing Sheets

CONTRACT TABLE 400

| CONTRACT ID 402 | PARENT ID 404 | PROFILE ID 406 | VALID FROM 408 | VALID TO 410 | ORIGINAL BALANCE 412 | CURRENT BALANCE 414 | GEOGRAPHY 416 |
|---|---|---|---|---|---|---|---|
| C10 | DEFAULT | 10 | | | | | |
| C11 | C10 | 11 | | | | | |
| . . . | . . . | . . . | . . . | . . . | . . . | . . . | |

Fig. 4

FAMILY/GEOGRAPHY PROFILE TABLE

| PROFILE ID | PRODUCT FAMILY | GEOGRAPHY | UPLIFT | DISCOUNT |
|---|---|---|---|---|
| 10 | | | | |
| ⋮ | | | | |
| 10 | | | | |
| 11 | | | | |
| ⋮ | | | | |
| 11 | | | | |
| ⋮ | | | | |

*Fig. 5B*

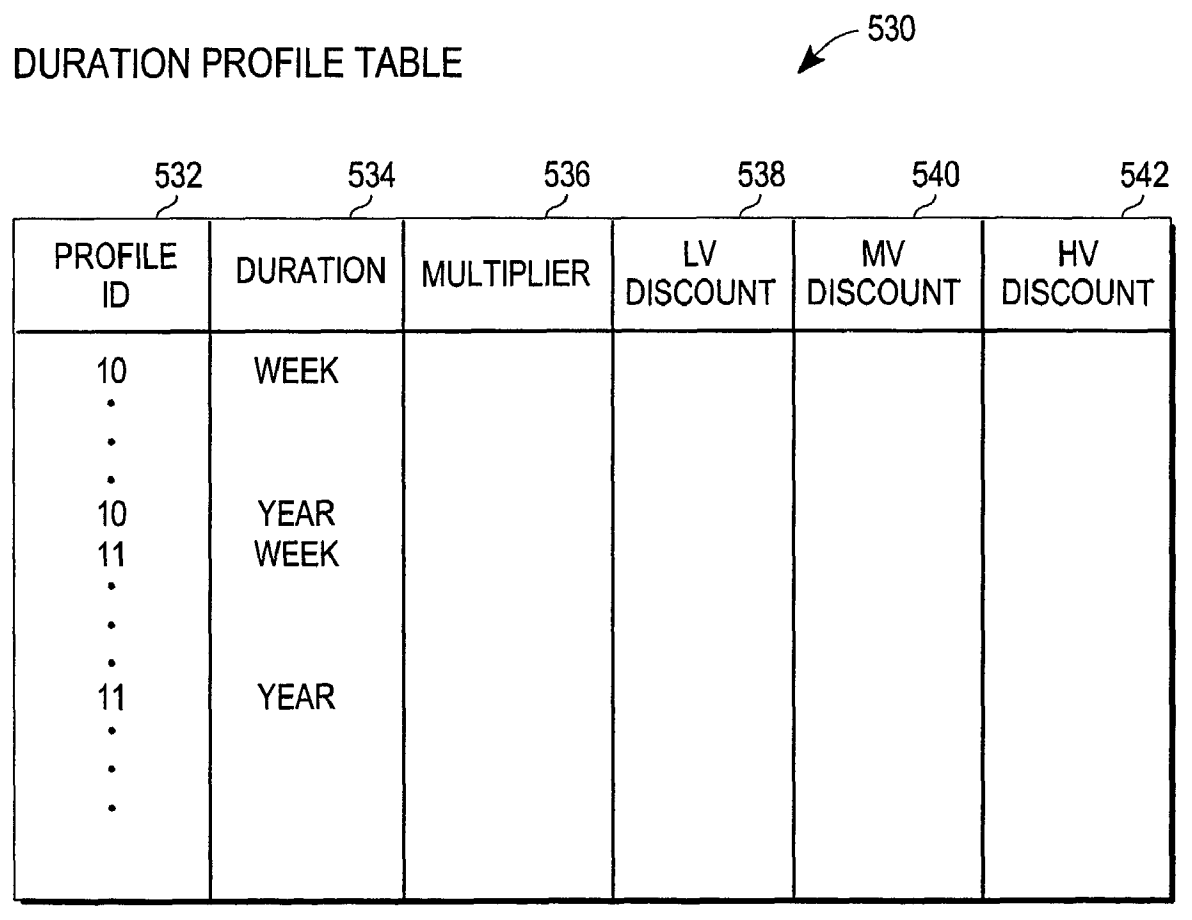

DURATION PROFILE TABLE 530

| PROFILE ID 532 | DURATION 534 | MULTIPLIER 536 | LV DISCOUNT 538 | MV DISCOUNT 540 | HV DISCOUNT 542 |
|---|---|---|---|---|---|
| 10 . . . . | WEEK | | | | |
| 10 | YEAR WEEK | | | | |
| 11 . . . . | | | | | |
| 11 . . . . | YEAR | | | | |

*Fig. 5C*

PRODUCT DISCOUNT PROFILE TABLE

| PROFILE ID | PRODUCT ID | DISCOUNT |
|---|---|---|
| 10 | | |
| ⋮ | | |
| 10 | | |
| 11 | | |
| ⋮ | | |
| 11 | | |
| ⋮ | | |

*Fig. 5D*

LICENCING TABLE 600

| TRANSACTION ID 602 | CONTRACT ID 604 | PRODUCT ID 606 | LICENSING AMOUNT 608 | LICENSING HOST 610 | SOFTWARE HOST 612 | LICENSE KEY 614 |
|---|---|---|---|---|---|---|
| ... | | | | | | |

Fig. 6

SOFTWARE LICENSING MANAGEMENT SYSTEM

CROSS REFERENCE TO OTHER APPLICATION

The subject matter disclosed in the present application is related to subject matter disclosed in U.S. application Ser. No. 09/854,330, entitled "Contract Management System", filed on the same date as the present application. The entire contents of the above-referenced application are incorporated herein by reference.

BACKGROUND

This invention relates generally to computer systems, and more particularly to a software licensing management system.

Traditionally, software licensing has been carried out based upon a "front-end" model. That is, the customer is required to decide up front what set or sets of software he needs to license, the duration of the license, how many copies of the software he needs, how many concurrent users there will be, as well as other licensing parameters. Once these decisions are made, and once the licensing fee is paid, the customer is allowed to use the software under the terms of the license. Once the license is purchased, the customer typically has no right to change any of the terms of the license (e.g. the customer typically cannot change the license to cover another set of software, or terminate the license prematurely to recover part of the licensing fee). Thus, if the customer estimated his needs incorrectly, or if his needs have changed, he typically has no recourse to change the terms of the license to fit his needs.

This approach has a number of significant drawbacks. First, it puts the customer in a very difficult position of determining, at the outset, what his needs will be. Often, this determination has to be made at the start of a project, a time at which the customer has little knowledge of what his needs will be. Because of this lack of knowledge, customers often overestimate their needs, and hence, overpay for the software license. Another drawback of this approach is that it limits the customer's incentive to take advantage of upgrades to the licensed software. Typically, to receive a license to an upgraded version, a customer has to pay an additional fee. Often, the additional fee is substantial. Thus, in order to obtain several upgrades to the same set of software, the customer sometimes has to pay significant amounts above and beyond the original licensing amount for substantially the same or just a slightly modified version of the software. For this reason, many customers choose to use outdated software rather than upgrade.

Overall, the front-end approach is very inflexible. It is ill-equipped to adapt to the changing needs of a customer. If a customer overestimates his needs, or if a project requiring the software is canceled, the customer loses his investment in the software. There is typically no option, for example, to trade the software in for another set of software. Because of its lack of flexibility, this model for licensing software leaves much to be desired. Consequently, an improved licensing methodology is needed.

SUMMARY

In light of the shortcomings discussed above, the present invention provides a mechanism for managing contracts, which may be used advantageously in the software licensing and other arenas. The present invention is based, at least partially, upon the observation that software licensing can be made much more flexible if it is done on a fulfillment basis. That is, rather than choosing, licensing, and paying for a particular set of software up front, a customer enters into a fulfillment contract with a provider, which entitles the customer to a certain quota of licensing resources that the customer can consume. Once the contract is established, the customer can decide, at a later time, what resources he wishes to consume. As a resource is consumed, the quota is reduced. This continues until the quota is reduced to zero, at which point the contract is completely fulfilled.

Managing software licensing in this way is much more flexible than with the front end model. First, it enables the customer to decide, at the time that he needs the software (not at the time of contract formation), the parameters of the license, and because of this, the customer is able to make a much more informed and better decision as to the software needed, the duration of the license, and other licensing parameters. Also, the fulfillment methodology makes it much easier to switch from one set of software to another (whether the other set of software is an upgrade or a completely different set of software). All a customer has to do is to discontinue use of the old software, obtain at least a partial refund on the unused portion of the license on the old software, obtain a license on the new software, and begin using the new software. The fulfillment methodology enables this transition to be made easily. Overall, licensing software on a fulfillment basis enhances a customer's ability to efficiently and cost-effectively adapt to his changing software needs.

To enable software to be licensed on a fulfillment basis, the present invention provides a contract management mechanism. In one embodiment, information pertaining to one or more contracts is stored in a database, with each contract having a quota associated therewith, which specifies a quota of resources that can be consumed under the contract. In addition, each contract may have associated with it additional parameters (also referred to as terms or rules) which govern the manner in which the contract is to be fulfilled. These additional parameters, which may differ from contract to contract, may be applied by the management mechanism to control the fulfillment of the contract. Once information pertaining to a contract is stored, the management mechanism is ready to carry out inquiries and transactions under that contract.

In operation (assuming a software licensing implementation for the sake of example), the management mechanism receives an inquiry from a customer/beneficiary of a particular contract regarding licensing of a particular set of software under that contract. In addition to specifying the particular set of software, the inquiry may further specify other parameters, such as the duration of the desired license. In general, all of the parameters of the inquiry (e.g. the particular set of software, the duration of the license, etc.) are freely selectable by the customer.

In response to the inquiry, the management mechanism determines a licensing amount attributable to licensing of that particular set of software under the contract. This licensing amount may be determined based upon many factors, including but not limited to the set of software selected, the other parameters specified in the inquiry, and the terms or rules associated with the contract. Since the terms or rules may vary from contract to contract, the licensing amount for the same set of software with the same set of inquiry parameters may differ from contract to contract. Once the licensing amount is determined, and the customer commits to licensing the software, the management mechanism reduces the quota of the contract by the licensing amount, and allows the software to be used under the contract. Licensing of the software under the fulfillment contract is thus achieved. Using the same process, other sets of software may be licensed under the same contract.

As noted, in determining the licensing amount, the management mechanism may apply the terms or rules associated with the contract. These rules may, for example, specify a discount to be applied to an initial licensing amount to derive the actual licensing amount. In some instances, determining the rule or rules to apply to an inquiry is not a simple process. This is because some inquiries may implicate more than just one contract. For example, a customer may have a particular fulfillment contract with a provider that has a certain set of rules associated therewith. A company, of which the customer is an employee, may also have a contract with the provider that has a different set of rules. Further, a division of that company, of which the customer is a member, may have its own contract with the provider with a different set of rules. Since the customer is, in a sense, a beneficiary of all three contracts, an inquiry from the customer may implicate all three contracts.

To accommodate such a situation, one embodiment of the management mechanism comprises a contract reconciliation mechanism for reconciling terms in multiple contracts. That is, given multiple contracts with different terms, the management mechanism determines, for a particular inquiry, which terms from which contracts govern to derive a set of reconciled terms. Once derived, the reconciled terms are applied to process the inquiry. With this aspect of the management mechanism, it is possible to store information pertaining to multiple contracts in a system, with each contract potentially having different terms, and to have the management mechanism reconcile the terms of the contracts on an inquiry by inquiry basis. By automating the contract reconciliation process, which currently is carried out manually, the management mechanism greatly simplifies the contract management process, making it possible to form multiple layers of contracts with many different parties. In one embodiment, the contract reconciliation mechanism is implemented as part of the management mechanism. However, it should be noted that the contract reconciliation mechanism is not so limited, but rather may be implemented in any application in which it is desirable to reconcile terms among multiple contracts.

From the above discussion, it is clear that the management mechanism can be used advantageously to manage the licensing of software. It should be noted, though, that the management mechanism's application is not so limited. Rather, it may be implemented in any application in which it is desirable to manage one or more contracts. These contracts may involve any type of resources, or even a mix of resources. For example, the resources that can be managed include but are not limited to services, products, and licenses to any type of property, such as software, intellectual property, and any type of proprietary information. Overall, the management mechanism may be implemented in many different contexts in addition to software licensing.

BRIEF DESCRIPTION OF THE DRAWINGS

FIG. 4 is a diagram of one possible embodiment of a Contracts Table that may be used to store contract information in accordance with one embodiment of the present invention.

FIGS. 5B-5C are sample profile tables illustrating the manner in which profile information may be spread across multiple profile tables.

FIG. 6 is a diagram of one possible embodiment of a Licensing Table that may be used to store license information in accordance with one embodiment of the present invention.

DETAILED DESCRIPTION OF EMBODIMENT(S)

Functional Overview

Figure 1:
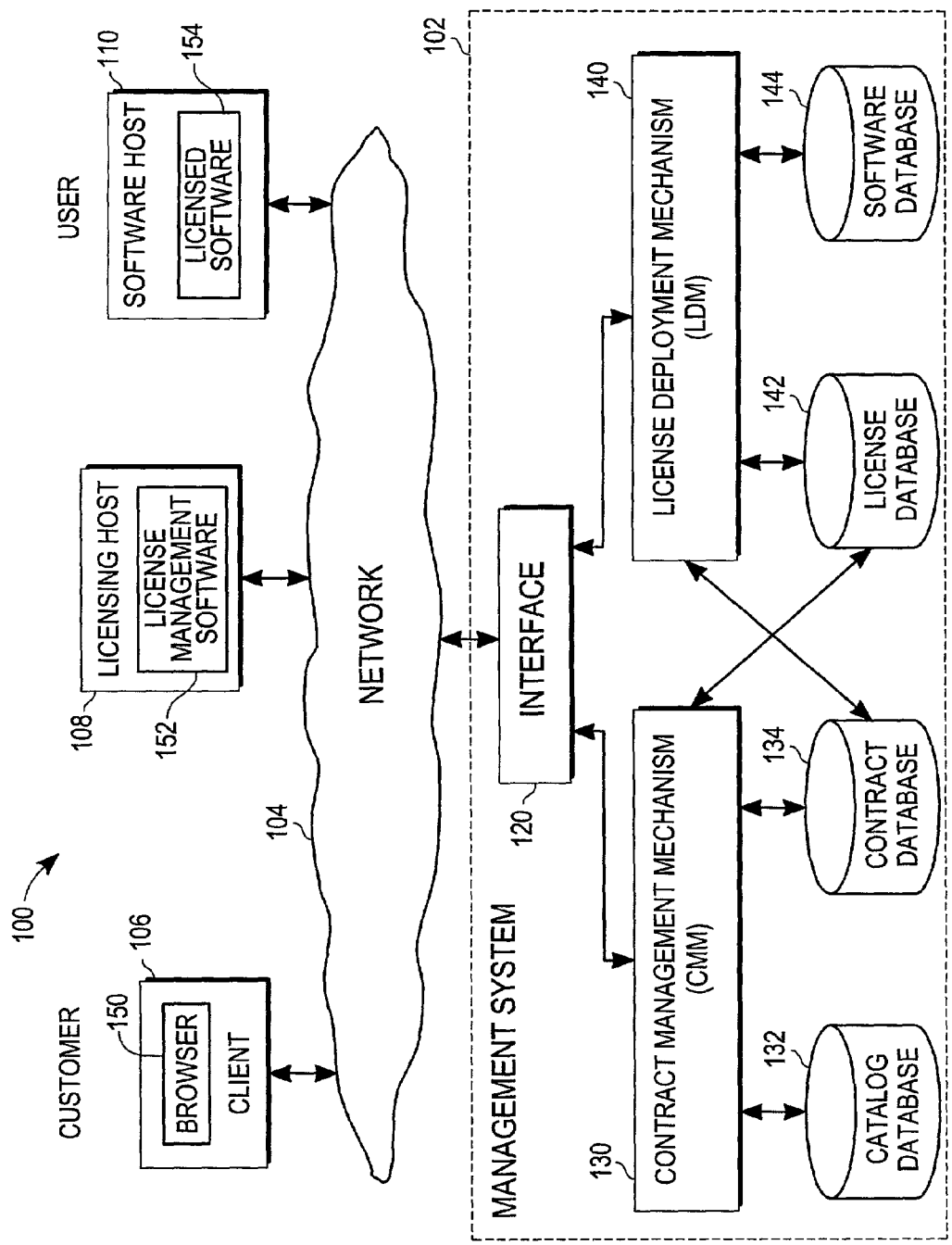
FIG. 1 is functional block diagram of a system in which one embodiment of the present invention may be implemented.

With reference to FIG. 1, there is shown a functional block diagram of a system 100 in which one embodiment of the present invention may be implemented. In the following discussion, it will be assumed for the sake of illustration that the invention is implemented in a software licensing context. However, it should be noted that the invention is not so limited, but rather may be applied to any context in which it is desirable to implement a contract management system. For example, the invention may be used to manage contracts involving any type of resources including but not limited to goods, products, services (e.g. technical support, IC masking, prototyping, simulation, product engineering/design, assembly, testing, etc.), and licenses to any type of property, including but not limited to intellectual property (e.g. trademarks, patents, copyrights, trade secrets) and any type of proprietary information/material (e.g. software, product designs, manuals, etc.). In addition, the invention may be used to manage contracts involving a mix of different types of resources (e.g. a contract may allow products, services, and licenses to be obtained/consumed under the same contract). These and other implementations are within the scope of the present invention.

Entities and Network

As shown, system 100 comprises a management system 102, a network 104, and a plurality of entities that invoke the functionality of the management system 102, including a client 106, a licensing host 108, and a software host 110. For the sake of simplicity, only one of each of these entities 106, 108, 110 is shown in FIG. 1, but it should be noted that the management system 102 is capable of interacting with any number of invoking entities. From a functional point of view, each of the entities 106, 108, 110 is a separate component; however, from a physical standpoint, the entities 106, 108, 110 maybe embodied on any combination of machines. That is, all of the entities 106, 108, 110 may be embodied in the same machine, each entity may be embodied on a different machine, or some combination thereof.

The client 106 is the entity that is used by a customer to interact with the management system 102. Using the client 106, the customer may interact with the management system 102, for example, to browse a list of software available for licensing, submit an inquiry for a quote on a particular set of software, submit a request to carry out a transaction under a contract, and manage and deploy licenses that have been obtained. For purposes of the present invention, the client 106 may be any entity capable of communicating with the management system 102 via network 104. In one embodiment, the management system 102 is implemented in an Internet environment. In such an implementation, the client 106 may be a computer running a standard browser program 150.

Whereas the client 106 is used by a customer to select and license a set of software, the licensing host 108 and the software host 110 are used by a user to actually run the software (note: the user and the customer may be the same person or they may be different people). In one embodiment, the licensing host 108 runs a set of license management software 152. As will be explained further in a later section, the license management software 152 ensures that the terms of a license, once it is obtained from the management system 102, are enforced. For example, the license management software 152 makes sure that the number of users using a set of licensed software does not exceed the number specified in a license.

The entity that actually runs a set of licensed software 154 is the software host 110. In one embodiment, the software host 110 interacts with the licensing host 108 each time it runs the licensed software 154. More specifically, when the licensed software 154 is executed by the software host 110, the licensed software 154 causes the software host 110 to establish a connection with the license management software 152 of the licensing host 108. Using this connection, the licensed software 154 requests authorization from the license management software 152 to execute. If authorization is obtained, then the licensed software 154 continues executing on the software host 110. If authorization is not obtained, then execution of the licensed software 154 terminates. In this manner, the terms of the software license are enforced. The manner in which the management system 102 interacts with the licensing host 108 and the software host 110 will be elaborated upon in a later section.

The entities 106, 108, 110 communicate with the management system 102 via network 104. For purposes of the present invention, the network 104 may be any type of network, including but not limited to a local area network and a wide area network such as the Internet. The network 104 may even be as simple as one or more direct connections. Any mechanism capable of facilitating communication between the entities 106, 108, 110 and the management system 102 may serve as the network 104.

Management System

The management system 102 provides most of the functionality of system 100. In one embodiment, the management system 102 is implemented in an Internet environment; thus, its functionality is embodied in a web server, which communicates with the entities 106, 108, 110 via requests, links, and web pages. The management system 102 may be embodied in a single machine, or its functionality may be distributed across any combination of multiple machines. Any desired configuration may be implemented.

In the embodiment shown in FIG. 1, the management system 102 comprises an interface 120 coupled to the network 104, a contract management mechanism (CMM) 130, and a license deployment mechanism (LDM) 140. In one embodiment, the interface 120 acts as a gateway between the CMM 130 and the LDM 140, and the rest of the entities 106, 108, 110 on the network 120. In acting as a gateway, the interface 120 performs several different functions. For example, one function is to facilitate communication between the client 106 and the mechanisms 130, 140. As noted above, in one embodiment, the management system 102 is implemented in an Internet environment; thus, the interface 120 provides a front end for receiving requests from and providing response pages to the client 120 (whether those response pages are retrieved/generated by the interface 120 or by one of the mechanisms 130, 140).

Another function of the interface 120 is to log a customer in to the management system 102. In one embodiment, this is done using a username/password methodology. Once a customer is logged in to the system 102, a session is started and the customer is allowed to access the functionality of the CMM 130 and the LDM 140. In one embodiment, the customer's username and password are associated with a particular contract ID; thus, by the time the customer is logged in to the system 102, the contract being invoked by the customer is already known.

Contract Management Mechanism

The contract management mechanism (CMM) 130 is the component responsible for interacting with the customer (via client 106) to manage a contract. In one embodiment, the CMM 130 enables the customer to browse through a set of available software, obtain quotes on selected sets of software, and obtain licenses to selected sets of software under the contract. In carrying out its functions, the CMM 130 has access to several databases, including a catalog database 132, a contracts database 134, and a license database 142. The catalog database 132 contains one or more listings of the sets of software that are available to the customer for selection. In addition, the catalog database 132 may contain detailed information pertaining to each set of software. The CMM 130 accesses and provides this information to the customer to enable the customer to browse through and select certain sets of software.

In the course of browsing, the customer may find a set of software to be of interest. In such a case, the customer may request a quote on the software. That is, the customer may inquire as to what amount of resources will be consumed under the contract if that particular set of software is licensed. In submitting this inquiry, the customer may specify a number of different parameters. These parameters may include, for example, a reference to the particular set of software, the number of desired copies of the software, the number of concurrent users of the software, the duration of the desired software license, etc. In one embodiment, these parameters are freely selectable by the customer.

In response to the inquiry, the CMM 130 determines and provides a quote to the customer. In determining the quote, the CMM 130 uses the parameters specified in the inquiry. In addition, the CMM 130 consults the contracts database 134, and extracts therefrom information pertaining to the contract that is being invoked by the customer. This contract information comprises a set of terms or rules that are specific to the contract, and that govern how the contract is to be managed. These terms or rules are established at the time the contract is formed, and specify how the contract is to be fulfilled. For example, the terms or rules may specify an uplift to be applied to increase the price of a set of software, or a discount to be applied to reduce the cost of the set of software. In addition, the terms or rules may set forth one or more additional benefits to be derived if one or more conditions are met (e.g. a free set of related software is provided if a particular set of software is licensed). Furthermore, the terms or rules may specify conditions under which particular terms or rules will apply (e.g. an uplift A will be applied if the customer is based in Europe, or a discount X will be given if product Y is purchased). Basically, the terms or rules represent the negotiated terms of the contract. These terms are enforced by the CMM 130 at the time of processing an inquiry under the contract. Because the functionality of the CMM 130 is determined, in part, based upon the terms or rules associated with a contract, the CMM 130 is referred to as being "rule-driven". Using the parameters specified in the inquiry, and by applying the terms or rules associated with the contract, the CMM 130 determines and provides the quote requested by the customer. In one embodiment, this quote represents a licensing amount attributable to licensing of the selected software under the contract.

To enable the CMM 130 to enforce the terms of a contract, certain information is stored in the contracts database 134. In one embodiment, the contracts database 134 stores at least two types of information: (1) contract information; and (2) profile information. Contract information comprises the basic information pertaining to a contract, such as the quota of resources that can be consumed under that contract (this quota may be expressed in terms of any type of unit, including but not limited to dollars and credits). Profile information comprises all of the terms or rules associated with a contract. The profile information may specify any aspect or term of a contract (e.g. uplift or discount to be applied, additional benefit, conditions under which certain terms are to be applied, etc.). These terms are negotiated and established at the time of contract formation, and are stored in the contracts database 134 at that time. The contract and profile information may be stored in the contracts database 134 using any user interface, such as an editor program (not shown), a database application (not shown), or even the CMM 130 (assuming an administrator logs in to the interface 120 using a special username and password which grants the administrator special access to the contracts database 134).

Figure 2:
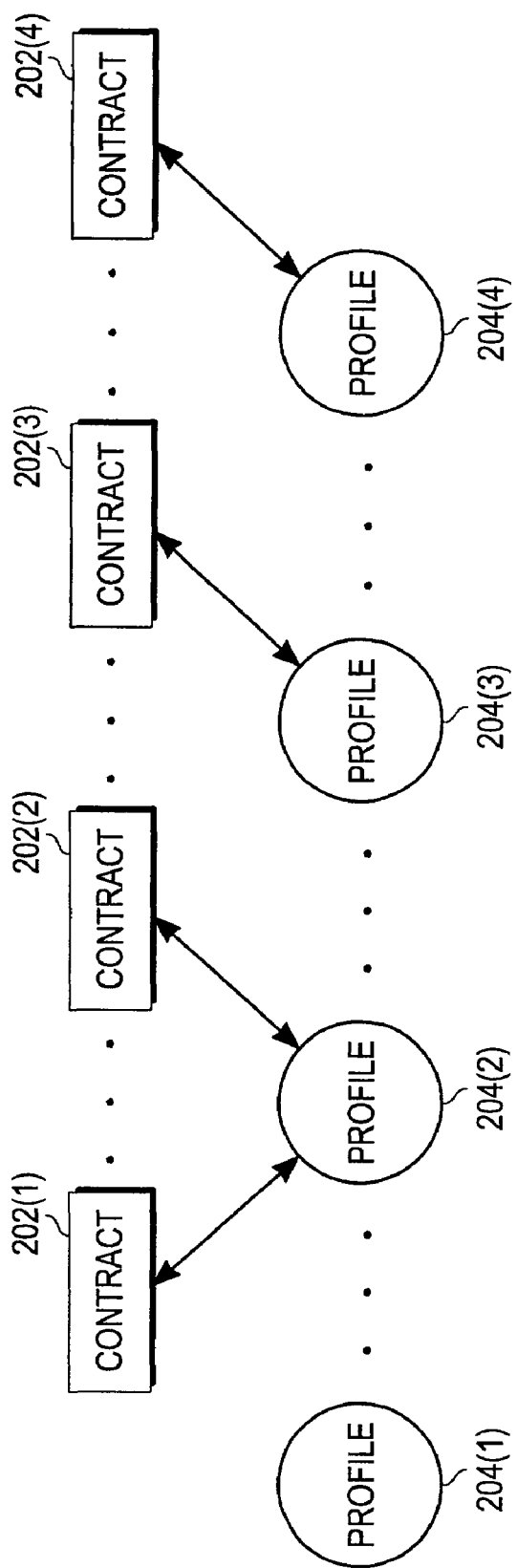
FIG. 2 is a functional diagram depicting the relationship between contract and profile information in accordance with one embodiment of the contracts database of FIG. 1.

In one embodiment, each set of contract information has an associated set of profile information. However, each set of profile information may be associated with one or more sets of contract information. This functional relationship is shown in FIG. 2, wherein each set of contract information 202 is associated with one set of profile information 204, but each set of profile information, for example, 204(2), may be associated with more than one set of contract information 202(1) and 202(2). Such an arrangement is advantageous in that it allows multiple contracts with identical terms to share the same profile. It should be noted, though, that if so desired, each contract 202 may be associated with its own unique profile 204.

In addition to enabling the relationships between contracts and profiles to be specified, the contracts database 134 also allows relationships between contracts to be specified. These relationships may be used by the CMM 130 to determine which terms from which contracts are to be applied when an inquiry implicates multiple contracts. Put another way, the CMM 130 may use the contract relationship information to reconcile potentially conflicting terms among multiple contracts. To illustrate how such relationship information may be useful, reference will be made to the example shown in FIG. 3.

Suppose that a customer has a particular contract 302(1) with a provider that has a certain profile 304(1) associated therewith. Suppose further that the customer is a member of a division of a company, and that that division has its own contract 302(2) with the provider with a different associated profile 304(2). In addition, suppose that the company has a master contract 302(3) with the provider that has a different associated profile 304(3), as shown. Because the customer is a member of the division and an employee of the company, the customer is in a sense a beneficiary of all three contracts 302(1)-302(3). As a result, an inquiry from the customer may implicate all three contracts. In such a case, there may be some ambiguity as to which terms in which contracts are to be applied to the customer's inquiry. To properly process the inquiry, this ambiguity should be reconciled. Specifying a hierarchy between the contracts provides one possible means for achieving this reconciliation.

Figure 3:
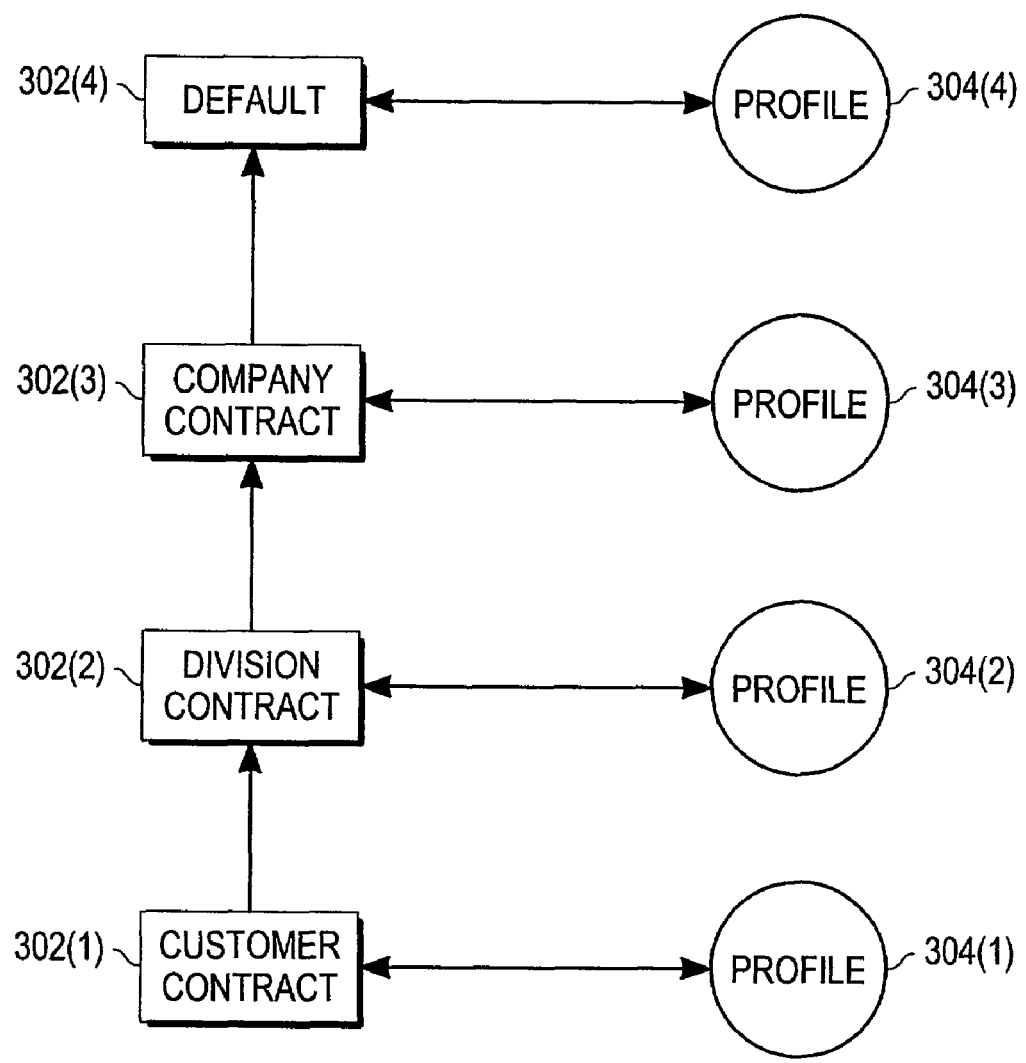
FIG. 3 is a functional diagram depicting an example of the hierarchical relationship that may be maintained between contracts in accordance with one embodiment of the present invention.

To elaborate, in FIG. 3, the division contract 302(2) is specified as a parent of the customer contract 302(1). Likewise, the company contract 302(3) is specified as a parent of the division contract 302(2). With this hierarchical information, it is possible for the CMM 130 to determine, in an orderly fashion, which terms from which profile 304 are to be applied to the inquiry. In one embodiment, the CMM 130 begins at the level of the customer contract 302(1). Searching in the profile 304(1) associated with the customer contract 302(1), the CMM 130 looks for a term or rule that applies to a particular set of conditions set forth in the inquiry. For example, the CMM 130 may be searching for an uplift to be applied when the customer is based in Europe and the software being quoted is in the product family Z. Depending upon the contents of the profile 304(1), the CMM 130 may or may not find a rule that applies under these conditions. This is because in one embodiment, profile information is populated sparsely, which means that there is not a rule specified for all possible combinations of all conditions. That being the case, for a particular set of conditions, the CMM 130 may not find a rule in profile 304(1) that applies. In such a case, the CMM 130 proceeds to the profile of the parent contract. In the example of FIG. 3, the CMM 130 proceeds to the profile 304(2) associated with the division contract 302(2).

The CMM 130 carries out a similar process with this profile 304(2). Namely, it looks for a rule that applies to the particular set of conditions. If an applicable rule is found, then the CMM 130 applies that rule. Otherwise, it proceeds to the profile 304(3) of the next parent contract 302(3). This continues until either an applicable rule is found, or the default contract 302(4) is reached, at which point, a default rule from the profile 304(4) is applied. In one embodiment, every contract hierarchy ends with the default contract 302(4). That way, it is assured that at least a default rule will be found and applied. By traversing the hierarchy in this manner, the CMM 130 is able to reconcile potentially conflicting terms in multiple contracts. With this capability of the CMM 130, it is possible to store information pertaining to multiple contracts in a system, with each contract potentially having different terms, and to have the CMM 130 reconcile the terms of the contracts on an inquiry by inquiry basis. By automating the contract reconciliation process, which currently is carried out manually, the CMM 130 greatly simplifies the contract management process, making it possible to form multiple layers of contracts with many different parties. In the embodiment described thus far, contract reconciliation is implemented as part of the CMM 130 in the context of licensing software. However, it should be noted that the contract reconciliation mechanism is not so limited, but rather may be implemented in any context in which it is desirable to reconcile terms among multiple contracts.

In the manner described above, the CMM 130 provides a quote to a customer on a selected set of software. Upon reviewing the quote, the customer may decide to accept the quote and initiate a transaction to license the software. By the time the customer accepts a quote, the following information is already known: (1) all of the parameters of the license (e.g. the set of software selected, the duration of the license, etc.) since these were submitted with the inquiry for the quote; (2) the contract that is being invoked by the customer, and hence, the quota of resources that can be consumed under the contract; and (3) the licensing amount (i.e. the quote) attributable to licensing of the desired software. Thus, the CMM 130 has all of the information that it needs to complete the licensing transaction. In one embodiment, the CMM 130 completes the transaction by reducing the quota of the contract by the licensing amount, and updating the license database 142 to indicate that a license to the selected software, having certain specified parameters, has now been granted under the contract. The license is thereafter ready to be deployed.

License Deployment Mechanism

To deploy the license and the licensed software, the customer interacts with the license deployment mechanism (LDM) 140 (FIG. 1). In one embodiment, the LDM 140 allows the customer to deploy the license and software to any host or hosts specified by the customer, whether the host is at one of the customer's sites or another site, or whether the host is operated by the customer or another business entity. In deploying software, the LDM 140 has access to the license database 142 and a software database 144. The license database 142 stores all of the licenses that have been granted by the CMM 130, and the software database 144 stores all of the sets of software that can be deployed by the LDM 140.

In deploying a set of software, the LDM 140 in one embodiment first obtains a set of license management software 152 from the software database 144. Then, the LDM 140 sends the license management software 152 to a licensing host 108 specified by the customer for downloading and installation thereby. In one embodiment, the license management software 152 is a commercially available set of software, such as FlexLM manufactured by Globetrotter, Inc. In addition to the license management software 152, the LDM 140 also sends information pertaining to the particular license that the customer is deploying, which sets forth all of the parameters associated with the license (e.g. the software covered by the license, the duration of the license, etc.). The license is thus deployed.

To deploy the licensed software, the LDM 140 obtains the licensed software 154 from the software database 144, and sends it to a software host 110 specified by the customer. In response, the software host 110 downloads and installs the licensed software 154 to prepare it for execution. Once that is done, the licensed software 154 is ready to be run. In one embodiment, each time the licensed software 154 is run, it establishes a connection with the license management software 152. This connection is used to request execution authorization. If authorization is obtained, then the licensed software 152 is allowed to continue running. Otherwise, execution of the licensed software 152 terminates. In determining whether to grant authorization, the license management software 152 references the particular license that was provided by the LDM 140. If the terms of the license are met, then execution authorization is granted to the licensed software 152. Otherwise, authorization is withheld. The terms of the license are thus enforced.

In addition to deploying licenses and software, the LDM 140 also allows a customer to manage licenses that have already been obtained. One of the aspects that can be managed using the LDM 140 is referred to herein as "remix". More specifically, after a license is obtained, a customer may wish to alter the license in some way, for example, to cancel the license and obtain a credit. This may happen, for example, if a project requiring the software is canceled and, thus, the software is no longer needed. In providing a customer with credit for an unused portion of a license, the LDM 140 is in a sense mixing the resources previously consumed under the contract back into the quota of the contract, hence, the name remix.

In one embodiment, the LDM 140 carries out remix as follows. Initially, the LDM 140 receives a request from the customer to remix a particular license. In response, the LDM 140 accesses the specifics of the license from the license database 142. In one embodiment, the license information stored in the license database 142 includes the amount of resources that were consumed by the license, and the valid dates of the license. Based upon this and other information, the LDM 140 determines a refund or remix amount to return to the customer. For purposes of the present invention, the remix amount may be determined using any desired methodology. For example, it may be computed based purely on a pro rata basis such that the customer is given full credit for the unused portion of the license. As an alternative, a return or restocking charge may be imposed. In addition, the remix amount may be determined based upon terms or rules specified in the contract. In such a case, the LDM 140 may process the rules of the contract in a manner similar to that previously described in connection with the CMM 130. Regardless of the methodology used, once the remix amount is derived, the LDM 140 adds it to the quota of the contract to remix the resources back into the contract. The customer is thereafter free to use those resources on another set of software. In addition, the LDM 140 performs two more tasks. First, it cancels the license in the license database 142. This may be done, for example, by deleting the licensing from the database 142 or by marking the license as being no longer valid. Second, the LDM 140 sends a message to the license management software 152 on the licensing host 108 to instruct the software 152 to cancel the license that has just been remixed. That way, the next time the software host 110 runs the licensed software 154, the license management software 152 will not grant execution authorization. The remixed license is thus completely canceled. In the manner described, the LDM 140 interacts with the customer to manage existing licenses.

An overview of the system 100 has now been disclosed. With reference to the remaining figures, one possible specific embodiment will now be described.

Databases

Contracts Database

As discussed previously in connection with FIG. 2, the contracts database 134 (FIG. 1), in one embodiment, stores at least two types of information: (1) contract information; and (2) profile information. Contract information comprises the basic information pertaining to one or more contracts, while profile information comprises all of the terms or rules associated with the one or more contracts. In one embodiment, both types of information are stored in the contracts database 134 in the form of tables. With reference to FIG. 4, there is shown one possible embodiment of a Contracts Table 400 in which contract information may be stored.

As shown, the Contracts Table 400 comprises a plurality of columns, with each column storing a particular parameter of a particular contract. In the Contracts Table 400, each row represents a single contract. The columns in the Contracts Table 400 include a Contract ID column 402, a Parent ID column 404, a Profile ID column 406, a Valid From 408 and a Valid To 410 column, an Original Balance column 412, a Current Balance column 414, and a Geography column 416. If so desired, more columns may be added to Table 400 to store additional information pertaining to each contract.

The Contract ID column 402 stores a unique ID associated with a specific contract. This ID is assigned to a contract at the time of contract formation, and is used to refer uniquely to the contract. That being the case, the contract ID acts as a primary key to the Contracts Table 400. The Parent ID column 404 holds the contract ID of a parent contract. As discussed previously in connection with FIG. 3, it is possible to specify a hierarchical relationship between contracts. For example, contract B may be specified as a parent to contract A, contract C may be specified as a parent to contract B, and so on. In Contracts Table 400, the Parent ID column 406 is used to specify a parent-child relationship between different contracts. The Profile ID column 406 stores an ID of a profile with which a contract is associated. As noted previously in connection with FIG. 2, each contract is associated with a profile. The Profile ID column 406 allows this contract-profile association to be specified.

The Valid From column 408 and the Valid To column 410 store the starting and ending effective dates, respectively, of a contract. Using these values, it can be determined whether a contract is currently valid. The Original Balance column 412 and the Current Balance column 414 store the quota values of a contract. Specifically, the Original Balance column 412 stores the quota of resources that originally could have been consumed under the contract, and the Current Balance column 412 stores the quota of resources that remain to be consumed under the contract. The quota values in columns 412 and 414 may be expressed in terms of any type of units, including but not limited to dollars and credits. The Geography column 416 stores a value indicating to which geographical region a contract pertains. This value may be used to determine which rules in a profile to apply.

Figure 5A:
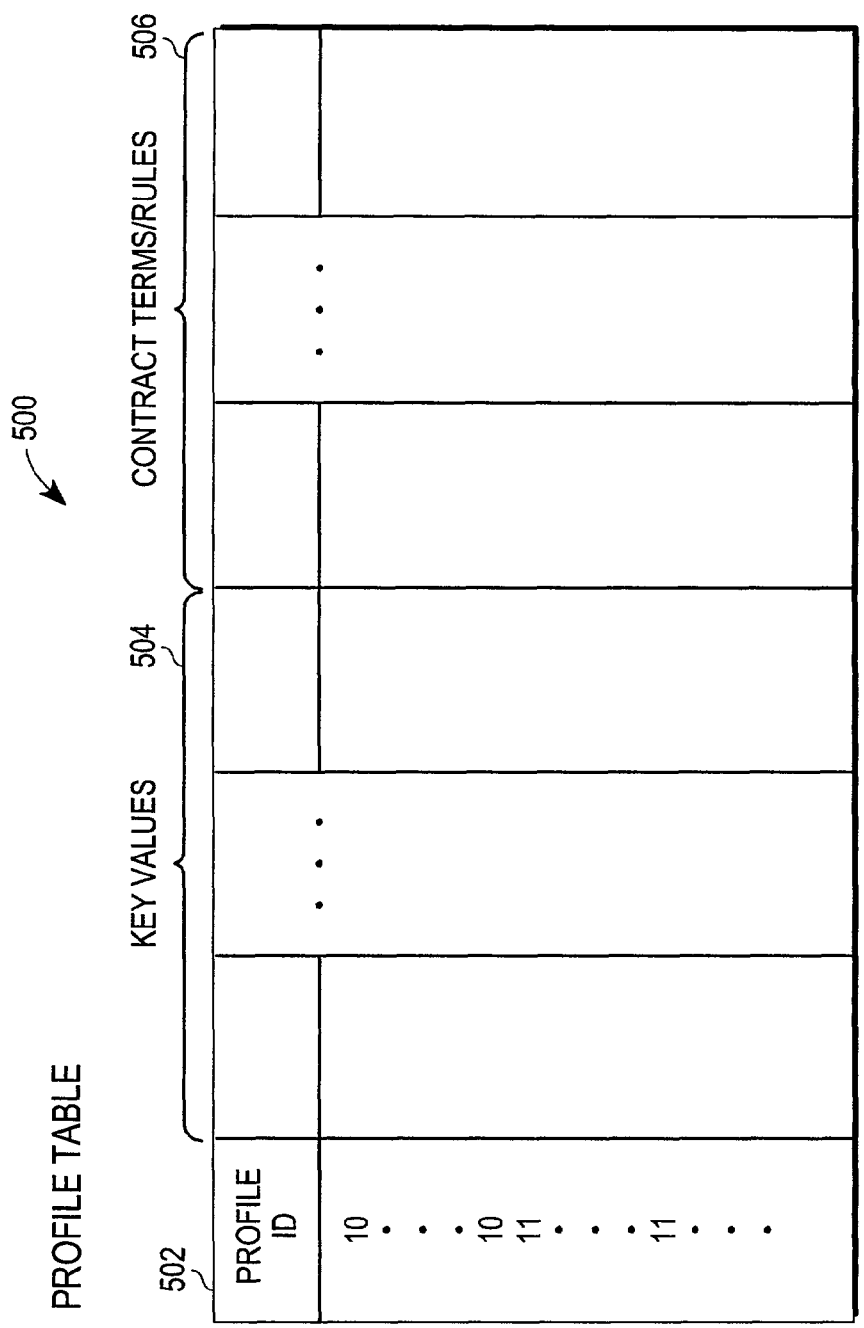
FIG. 5A is a general diagram of one possible embodiment of a Profile Table that may be used to store profile information in accordance with one embodiment of the present invention.

With reference to FIG. 5A, there is shown a general format for one possible embodiment of a Profile Table 500 in which profile information may be stored. As noted above, profile information comprises the terms or rules associated with one or more contracts. In Profile Table 500, each row represents one rule associated with a particular profile. Because a profile may have (and usually does have) more than one rule, there may be multiple rows in Table 500 for each profile. As shown, Profile Table 500 comprises a Profile ID column 502, one or more Key Value columns 504, and one or more Contract Terms/Rules columns 506. If so desired, more columns may be added to Table 500 to store additional information pertaining to each term or rule.

The Profile ID column 502 stores an ID associated with a particular profile. Each profile has its own unique ID; thus, the profile ID specifies to which profile a particular rule pertains. Because multiple rules may pertain to the same profile, the same profile ID may be stored in multiple rows of the Profile Table 500, as shown in FIG. 5. The Key Value columns 504 store the key values associated with each particular rule. In one embodiment, before a rule is applied to a particular inquiry, all of the key values for that rule need to be satisfied by the inquiry. If any of the key values is not satisfied, then that rule is not applied. In effect, the Key Value columns 504 specify the conditions under which a rule is to be applied.

In one embodiment, the Profile Table 500 is sparsely populated. This means that the table 500 does not contain a rule for every possible combination of key values for every profile. Thus, for a particular inquiry having a particular set of key values searching through a particular profile, there may not be a rule specified in that profile for that combination of key values. In such a case, it may be desirable to search through another profile to find a rule that does apply. This will be explained in greater detail in a later section. Making the Profile Table 500 a sparsely populated table in this manner reduces storage consumption. In addition, it improves performance by significantly reducing the number of rows that need to be searched to find an applicable rule. Thus, a sparsely populated profile table is advantageous. It should be noted, though, that if so desired, a fully populated profile table may be implemented without departing from the scope of the present invention.

The Contract Terms/Rules columns 506 store the actual value or values of a rule that are to be applied. For example, one of the Contract Terms columns 506 may specify a discount that is to be applied if certain conditions are met. Once a rule is determined to be applicable to a particular inquiry, it is the values in columns 506 that are actually applied to process the inquiry.

Thus far, profile information has been described as being stored in a single Profile Table 500. It should be noted, though, that if so desired, profile information may be spread across multiple tables, where each profile table stores a different type of rule. An example of an implementation in which profile information is spread across three separate profile tables is shown in FIGS. 5B-5D. In FIG. 5B, there is shown a Family/Geography Profile Table 510. In this table 510, there is a Profile ID column 512, a Product Family column 514, a Geography column 516, an Uplift column 518, and a Discount column 520. This table specifies, for each particular profile, what uplift and discount values are to be applied when certain combinations of product family and geography are encountered. For example, if a product is from product family A and the contract being invoked has country B in the Geography column 416 (FIG. 4), then uplift value C and discount value D should be used. In Table 510, since the Product Family 514 and Geography 516 columns store the key values that need to be satisfied before a rule is applied, these columns 514, 516 represent the key value columns of the Table 510. Since the Uplift 518 and Discount 520 columns store the values that are actually applied to an inquiry, these columns 518, 520 represent the contract terms/rules columns of the Table 510.

In FIG. 5C, there is shown a Duration Profile Table 530. In this table 530, there is a Profile ID column 532, a Duration column 534, a Multiplier column 536, an LV (low volume) Discount column 538, an MV (medium volume) Discount column 540, and an HV (high volume) Discount column 542. This table specifies, for each particular profile, the multiplier and the volume discounts that are to be applied to an inquiry given certain license durations. For example, if a customer wishes to license a set of software for a week, the multiplier might be A and the volume discounts might be B, C, and D, depending upon volume level. On the other hand, if the customer wishes to license the software for a year, the multiplier might be W, and the volume discounts might be X, Y, and Z. In Table 530, the Duration column 534 represents the key value column, and the Multiplier 536 and volume discount 538, 540, 542 columns represent the contract terms/rules columns.

In FIG. 5D, there is shown a Product Discount Profile Table 550. In this table 550, there is a Profile ID column 552, a Product ID column 554, and a Discount column 556. This table specifies, for each particular profile, what discount value is to be applied when a certain product is selected. For example, for product A, the discount might be X. For product B, there may be no discount. In Table 550, the Product ID 554 column represents the key value column, and the Discount column 556 represents the contract terms/rules column.

FIGS. 5B-5D provide an example of how profile information may be stored in multiple profile tables, with each table providing a different type of contract term/rule. For purposes of the present invention, profile information may be spread across any number of tables, and may be stored using any desired arrangement.

License Database

As noted previously, the License Database 142 (FIG. 1) stores information pertaining to licenses that have been granted by the CMM 130. In one embodiment, this licensing information is created by the CMM 130 when a license is granted, and used by the LDM 140 in managing and deploying existing licenses. In one embodiment, information is stored in the License Database 142 in the form of tables. One possible embodiment of a Licensing Table 600 that may be used to store license information is shown in FIG. 6. As shown, Licensing Table 600 comprises a Transaction ID column 602, a Contract ID column 604, a product ID column 606, a Licensing Amount column 608, a Licensing Host column 610, a Software Host column 612, and a License Key column 614. If so desired, more columns may be added to Table 600 to store additional information pertaining to each license/transaction. Each row in the Licensing Table 600 represents a single license/transaction.

In Table 600, the Transaction ID column 602 stores an ID associated with a transaction/license. In one embodiment, this transaction ID is assigned at the time the CMM 130 grants a license, and is unique for each transaction. Thus, column 602 may be used as a primary key into the Licensing Table 600. The Contract ID column 604 stores an ID of an associated contract. More specifically, column 604 stores the ID of the contract under which a license/transaction was granted. The Product ID column 606 stores the ID of the set of software that was licensed by a transaction. This information may be used by the LDM 140 to determine what set of software to deploy. The Licensing Amount column 608 stores the amount of resources that was consumed under a contract as a result of licensing the particular set of software identified in column 606. As will be elaborated upon in a later section, the licensing amount information stored in column 608 may be used by the LDM 140 in carrying out remix of a license. The Licensing Host 610 and Software Host 612 columns store information pertaining to the host machines on which a license and a set of licensed software, respectively, are deployed. This information may be populated and used by the LDM 140 to deploy a license and an associated set of software. The License Key column 614 stores a key specific to a particular license. In one embodiment, the value in column 614 comprises information about all of the parameters of a license. For example, the license key may specify the particular set of software being licensed, the valid start and end dates of the license, the number of copies of the software being licensed, the number of concurrent users allowed for the software, etc.

In addition, the license key may comprise a unique key for activating a set of licensed software. In one embodiment, the license key is sent by the LDM 140 to the licensing host 108 when deploying a license. The licensing host 108 thereafter uses the key to carry out execution authorization.

System Operation

Figure 7:
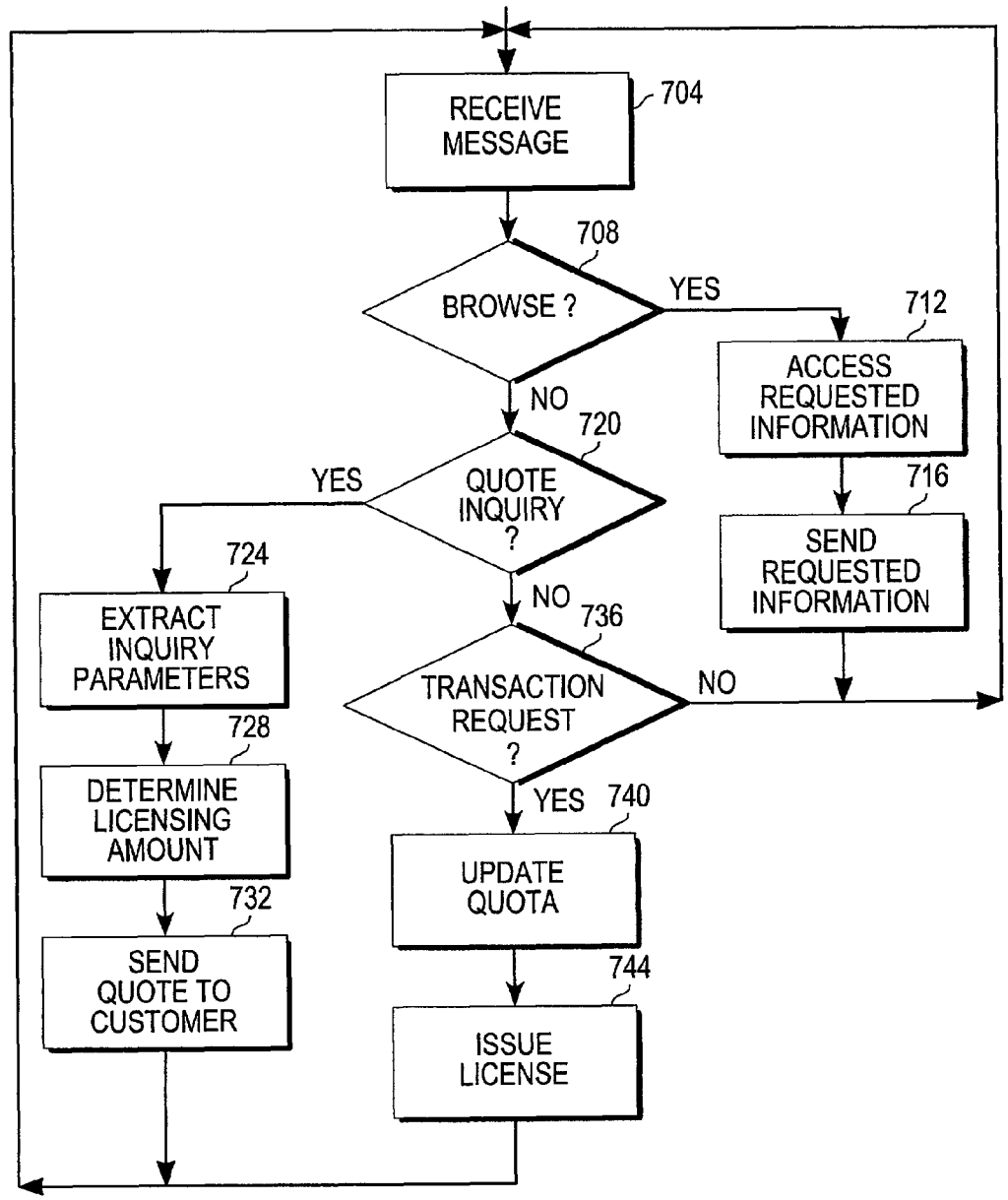
FIG. 7 is a flow diagram illustrating the operation of one embodiment of the contract management mechanism of the present invention.
Figure 8:
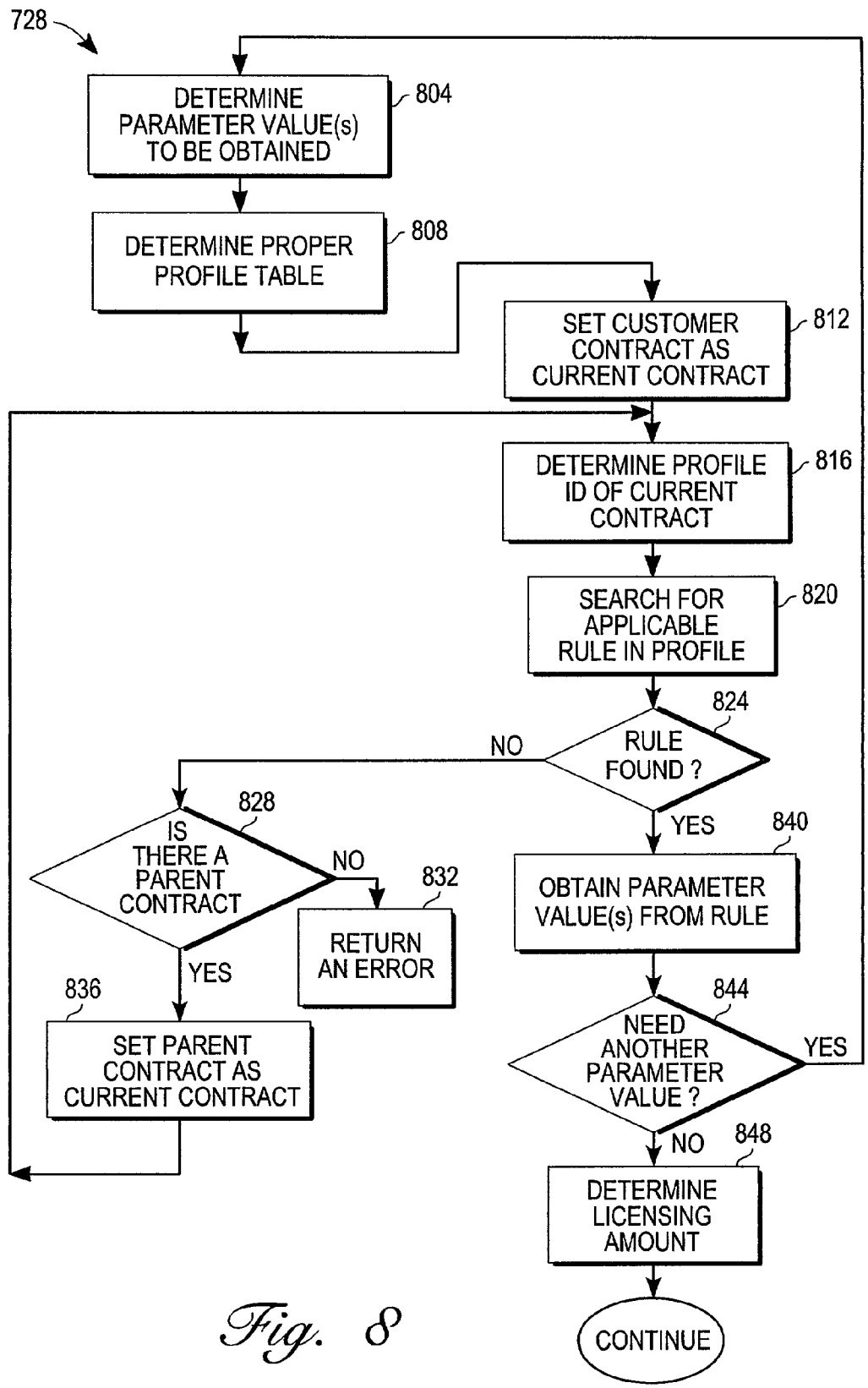
FIG. 8 is a flow diagram illustrating the manner in which a licensing amount may be determined in accordance with one embodiment of the present invention.
Figure 9:
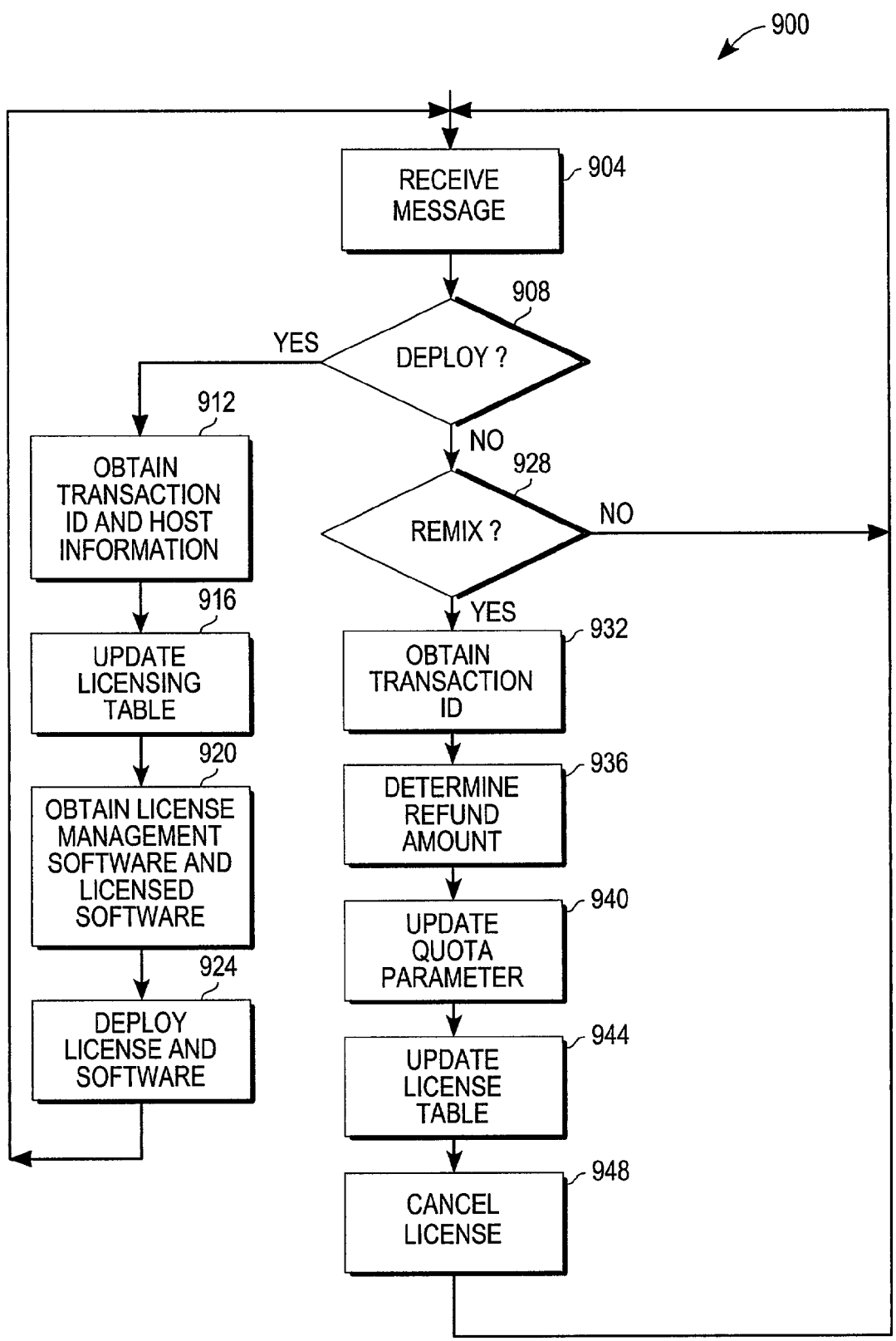
FIG. 9 is a flow diagram illustrating the operation of one embodiment of the license deployment mechanism of the present invention.

With the system overview and the structure of the databases disclosed above in mind, the operation of one embodiment of the management system 102 will now be described with reference to the flow diagrams of FIGS. 7-9. FIGS. 7 and 8 illustrate the operational flow of the CMM 130, and FIG. 9 depicts the operational flow of the LDM 140.

As shown in FIG. 7, the CMM 130 initiates operation by receiving (704) a message from a client 106 (FIG. 1). In one embodiment, this message is received via the interface 120. As noted previously, one of the functions of the interface 120 is to log a customer in to the management system 102. In doing so, the interface 120 associates a customer with a particular contract. Thus, by the time a message is received by the CMM 130, the contract ID of the contract being invoked by the customer is already known.

In response to the message, the CMM 708 determines (708) whether the message is a request to browse the system catalog. If so, the CMM 130 accesses (712) the information requested in the message from the catalog database 132, and provides (716) the requested information to the client 106 to be rendered to the customer. The information provided by the CMM 130 may include a list of available products, detailed information pertaining to a particular product, or any other information stored in the catalog database 132. Once the requested information is sent to the client 106, the CMM 130 loops back to (704) to receive another message from possibly the same client 106 or from a different client.

Returning to (708), if the CMM 130 determines that the message is not a request to browse the system catalog, then the CMM 130 proceeds to determine (720) whether the message is an inquiry for a quote on a particular set of software. If so, the CMM 130 proceeds to extract (724) a set of inquiry parameters from the message. In one embodiment, these inquiry parameters may include, but are not limited to, the particular set of software for which a quote is being sought, the duration of the desired license, the number of copies of the software, and the number of concurrent users of the software. In one embodiment, all of the parameters of the inquiry are selectable by the customer. In addition to the inquiry parameters, the CMM 130 also extracts other sets of information. These include the product ID and the product family associated with the particular set of software for which the quote is being sought (this information can be obtained from the catalog database 132), as well as some information pertaining to the contract being invoked (e.g. the geography (column 416 of FIG. 4) to which the contract pertains).

Once the inquiry parameters and the additional information are extracted, the CMM 130 proceeds to determine (728) a licensing amount attributable to licensing the selected set of software under the customer's contract. The licensing amount in effect represents the amount of resources that will be consumed under the contract if that particular set of software is licensed, given the specified inquiry parameters. For purposes of the present invention, the licensing amount may be determined using any desired methodology, but in one embodiment, it is determined using one or more formulas, which take in several profile parameter values as input. In one embodiment, these profile parameter values are derived from the terms or rules of one or more contracts. Since the profile parameter values may differ from contract to contract, the quote for the same set of software with the same set of inquiry parameters may differ from contract to contract, and hence, from customer to customer. By applying contract-specific profile parameter values, the CMM 130 enforces the specific terms of each contract. In one embodiment, this contract enforcement is carried out on an inquiry by inquiry basis.

FIG. 8 shows one possible process for carrying out the licensing amount determination of block (728). As shown in FIG. 8, the process begins with the CMM 130 making a determination (804) as to what profile parameter value(s) is to be obtained. As noted above, the formula(s) used to determine a licensing amount may call for several profile parameter values. If these values are stored in multiple profile tables, as is the case in the sample profile tables shown in FIGS. 5B-5C, then the CMM 130 does not obtain all of the values at once but rather obtains a few of them at a time. In such a case, the CMM 130 first determines which parameter value(s) to obtain.

Once the desired parameter value(s) is determined, the CMM 130 determines (808) which profile table to access to obtain the desired parameter value(s). For example, if the CMM 130 is trying to obtain a product discount value, then it should access the Product Discount Profile Table 550 (FIG. 5D). On the other hand, if it is looking for an uplift and a product family discount, then it should access the Family/Geography Profile Table 510 (FIG. 5A).

Once the parameter value and the corresponding profile table are determined, the CMM 130 proceeds to set (812) the customer contract as the current contract. As noted above, by the time the CMM 130 is accessed, the interface 120 has already determined which contract is being invoked by the customer. Thus, the contract ID associated with the customer contract is already known. That being the case, the CMM 130 uses that contract ID and sets it as the current contract. For the sake of example, it will be assumed that the ID of the contract being invoked by the customer is C10.

After the customer contract is set as the current contract, the CMM 130 proceeds to determine (816) the ID of the profile associated with the current contract. As noted previously, the profile associated with a contract contains the terms or rules for that contract. In one embodiment, the CMM 130 makes the profile ID determination by consulting the Contracts Table 400 (FIG. 4). More specifically, using the current contract ID (C10) as a key, the CMM 130 searches the Contracts Table 400 for a row that contains the current contract ID (C10) in the Contract ID column 402. Once that row is found, the CMM 130 access the Profile ID column 406 of that row to obtain the ID of the profile associated with the current contract. For the sake of example, it will be assumed that the current profile ID is 10. Using the current profile ID, the CMM 130 can access all of the terms or rules associated with the current contract.

Once the current profile ID is determined, the CMM 130 uses it to search through (820) the selected profile table for a rule that applies to the current inquiry. As an example, suppose that the CMM 130 is trying to obtain a product discount value from the Product Discount Profile Table 550 of FIG. 5D. Suppose further that the product ID of the software that is being quoted is Z. To determine whether a rule in Table 550 applies to the current inquiry, the CMM 130 searches the Table 550 for a row having the current profile ID (10) stored in the Profile ID column 552. If such a row is found, the CMM 130 determines whether the value stored in the Product ID column 554 of that row is "Z". If so, then the rule in that row applies. If not, the CMM 130 repeats the process. That is, it looks for another row in Table 550 having the current profile ID (10) stored in the Profile ID column 552, and if such a row is found, the CMM 130 determines whether the value stored in the Product ID column 554 of that row is "Z". This process continues until either an applicable rule is found, or there are no more rows in Table 550 with the current profile ID (10) stored in the Profile ID column 552.

As noted previously, the profile tables, in one embodiment are sparsely populated. Thus, an applicable rule may not be found in the current profile. If the CMM 130 determines (824) that there is no applicable rule in the current profile, it proceeds to determine (828) whether the current contract has an associated parent contract. In one embodiment, the CMM 130 makes this determination by: (1) searching through the Contracts Table 400 (FIG. 4) for a row having the current contract ID (C10) stored in the Contract ID column 402; and (2) looking in the Parent ID column 404 of that row for an ID of a contract. In one embodiment, every contract (except for the overall Default contract 302(4) of FIG. 3) has a parent contract. If no applicable rule has been found and if the current contract has no parent contract, the CMM 130 returns an error (832).

Assuming the current contract has an associated parent contract, the CMM 130 sets the parent contract as the new current contract and loops back to (816). Thereafter, the CMM 130 repeats the process of trying to find an applicable rule, only this time, it searches through the profile of the parent contract rather than the profile of the customer contract. If no applicable rule is found in the profile of the parent contract, the CMM 130 proceeds to the parent of the parent contract, and searches through the profile associated with that contract for an applicable rule. The CMM 130 repeats this process until either an error message is returned, or an applicable rule is found. The applicable rule may be a default rule in the profile 304(4) associated with the Default contract 302(4). In this manner, the CMM 130 processes a hierarchy of contracts to find an applicable rule.

At this point, it should be noted that the terms or rules in the different contracts of a hierarchy may differ. For example, for the same set of conditions, a rule in a customer contract may have a profile parameter value of X while a rule in the parent contract may have a value of Y. To reconcile the different rules, the CMM 130 in one embodiment selects the first applicable rule that it encounters. In the process discussed above, because the CMM 130 processes the contracts from the lowest level up, a rule in a child contract would take precedence over a rule in a parent contract. This is just one possible methodology for reconciling different terms in the various contracts. Other methodologies may be used without departing from the scope of the present invention.

Returning to (824), assuming that an applicable rule is found, the CMM 130 proceeds to obtain (840) from that rule one or more profile parameter values. For example, from the Product Discount Profile Table 550, the CMM 130 would obtain a discount value from the Discount column 550 of the applicable rule (i.e. the applicable row). Once the desired profile parameter value(s) is obtained, the CMM 130 determines (844) whether it needs any other profile parameter values. If so, it loops back to (804) to repeat the process that has been described. This process continues until all of the profile parameter values needed by the one or more formulas have been obtained. Once all of the profile parameter values have been obtained, the CMM 130 proceeds to determine (848) the requested quote (i.e. computes the licensing amount attributable to licensing the software selected by the customer). In one embodiment, the licensing amount is determined as follows. First, the CMM 130 obtains from the catalog database 132 an initial licensing amount for licensing the selected software according to the inquiry parameters. Then, the CMM 130 applies the profile parameter values to the initial licensing amount according to the one or more formulas to derive the actual licensing amount. This is just one methodology for determining the requested quote. Many other methodologies may be used without departing from the scope of the present invention. Returning to FIG. 7, once the CMM 130 determines the requested quote, it sends (732) the quote to the client 106, and loops back to (704) to receive another message.

Returning to (720), if the CMM 130 determines that the message is not an inquiry for a quote, then it proceeds to determine (736) whether the message is a request for a transaction. If not, the CMM 130 loops back to (704) to receive another message. If the message is a request for a transaction, then the CMM 130 proceeds to process the transaction to grant a license. By the time the CMM receives a transaction request, the following information is already known: (1) all of the parameters of the license (e.g. the set of software selected, the duration of the license, etc.) since these were submitted with the inquiry for the quote; (2) the contract that is being invoked by the customer; and (3) the licensing amount. Thus, the CMM 130 has all of the information that it needs to complete the licensing transaction.

In one embodiment, the CMM 130 completes the transaction by first updating (740) the quota of the contract. More specifically, using the contract ID of the customer contract, the CMM 130 accesses the row in the Contracts Table 400 having the customer contract ID stored in the Contract ID column 402. Then, assuming the value in the Current Balance column 414 of that row is greater than the licensing amount, the CMM 130 reduces the value in the Current Balance column 414 by the licensing amount. The quota of the customer contract is thus updated.

Thereafter, the CMM 130 issues (744) a license to the selected software to allow the software to be used under the customer contract. In one embodiment, the CMM 130 issues the license by updating the Licensing Table 600 (FIG. 6) of the License Database 142. More specifically, the CMM 130 updates the Licensing Table 600 by creating a new entry (i.e. a new row). In the new entry, the CMM 130 stores a unique ID in the Transaction ID column 602. In one embodiment, this ID is generated by the CMM 130 for the current transaction/license. In the Contract ID column 604, the CMM 130 stores the ID of the customer contract. In the Product ID column 606, the CMM 130 stores the ID of the set of software that is being licensed. The licensing amount attributable to licensing the software is stored in the Licensing Amount column 608. If any information pertaining to a licensing host and a software host is provided by the customer when requesting the transaction, that information is stored in columns 610 and 612. In addition, the CMM 130 generates and stores a license key in the License Key column 614. As noted previously, in one embodiment, the license key comprises information pertaining to all of the parameters of the license, as well as a unique key for activating the licensed software. Once the new entry is created and populated in the Licensing Table 600, the license and the licensed software are ready to be deployed.

To deploy the license and the software, the customer interacts with the LDM 140. With reference to FIG. 9, there is shown a flow diagram for one possible embodiment of the LDM 140. As shown, the LDM 140 operates by initially receiving (904) a message from the customer via the interface 120. In response, the LDM 140 determines (908) whether the message is a request to deploy a license and a set of software. If it is, then the LDM 140 proceeds to obtain (912) the information that it uses to deploy a license. In one embodiment, this information includes the transaction ID associated with the license that the customer is deploying, and information pertaining to a licensing host and a software host. The LDM 140 may obtain this information from the message (if it is included with the message), or by querying the customer. In one embodiment, the customer is allowed to deploy the license and the licensed software to any host or hosts specified by the customer, whether the host is at one of the customer's sites or another site, or whether the host is operated by the customer or another business entity.

Once the host information is obtained, the LDM 140 proceeds to update (916) the Licensing Table 600. More specifically, using the transaction ID, the LDM 140 searches for a row in the Licensing Table 600 having the transaction ID stored in the Transaction ID column 602. Once that row is found, the LDM 140 updates the Licensing Host column 608 and the Software Host column 610 of the row with the licensing host and software host information obtained from the customer. While it is accessing this row, the LDM 140 also extracts a product ID from the Product ID column 606 and a license key from the License Key column 614.

Using the product ID, the LDM 140 obtains (920) from the Software Database 144 (FIG. 1) the set of licensed software. In addition, it obtains from the Software Database 144 a set of license management software. Thereafter, the LDM 140 proceeds to deploy (924) the license, the license management software, and the licensed software to the appropriate hosts. Deployment may be carried out using any desired methodology, but in one embodiment, it is done via download. More specifically, the LDM 140 sends the license management software 152 to the Licensing Host 108 for download and installation thereby. In addition, the LDM 140 sends the license key to the Licensing Host 108, to be used by the license management software 152 to perform execution authorization. Furthermore, the LDM 140 sends the licensed software 154 to the Software Host 110 for download and installation thereby. Once that is done, the software is fully deployed, and the licensed software 154 is ready to be executed.

Returning to (908), if the LDM 140 determines that the message from the customer is not a request to deploy a set of software, then the LDM 140 proceeds to determine (928) whether the message is a request to carry out a remix. If not, the LDM 140 loops back to (904) to receive another message. If the message is a request to perform a remix, then the LDM 140 proceeds to obtain (932) the transaction ID of the license that the customer wishes to remix (i.e. cancel). The transaction ID may be obtained from the message (if it was included as part of the message) or it may be obtained by querying the customer.

Using the transaction ID, the LDM 140 accesses the appropriate row in the Licensing Table 600. More specifically, the LDM 140 searches through the Licensing Table 600 for a row having the transaction ID in the Transaction ID column 602. Upon finding that row, the LDM 140 extracts the licensing amount value from the Licensing Amount column 608, the license parameters (e.g. the valid start and end dates of the license) from the License Key column 614, and the contract ID from the Contract ID column 604. Using the licensing amount and the license parameters, the LDM 140 determines (936) a refund amount for the unused portion of the license. For purposes of the present invention, the refund amount may be determined using any desired methodology. For example, it may be computed based purely on a pro rata basis such that the customer is given full credit for the unused portion of the license (i.e. the licensing amount is prorated based upon how much time remains on the license, and that prorated amount is the refund amount). As an alternative, an additional return or restocking charge may be imposed. In addition, the refund or remix amount may be determined based upon terms or rules specified in the customer's contract or one of its parent contracts. In such a case, the LDM 140 may process the rules of the contract(s) in a manner similar to that previously described in connection with the CMM 130.

However the refund amount is determined, once it has been derived, the LDM 140 proceeds to update (940) the quota parameter of the customer contract. In one embodiment, the LDM 140 carries out this update function by updating an appropriate row in the Contracts Table 400 (FIG. 4). More specifically, using the contract ID, the LDM 140 accesses the row in the Contracts Table 400 having the contract ID stored in the Contract ID column 402. Then, the LDM 140 increases the value in the Current Balance column 414 of that row by the refund amount. The refund amount is thus remixed back into the customer contract, and is thereafter free to be used for other resources.

After the refund amount is remixed, the LDM 140 proceeds to update the various systems to indicate that the remixed license is no longer valid. To do so, the LDM 140 in one embodiment first updates (944) the Licensing Table 600 to indicate that the license is no longer valid. This may be done for example by deleting the row in the Licensing Table 600 associated with the remixed license. As an alternative, the row associated with the remixed license may be marked as being no longer valid. Thereafter, the LDM 140 cancels (948) the license with the license management software 152 on the Licensing Host 108. To do so, the LDM 140 in one embodiment sends a message to the license management software 152 to delete the license key associated with the remixed license. Without this license key, the license management software 152 will not be able to provide the licensed software 154 with the execution authorization that it needs to run. In this manner, the LDM 140 disables the licensed software. Once that is done, remix of the license is complete; hence, the LDM 140 loops back to (904) to receive another message.

For the sake of simplicity, only a basic remix management capability has been described for the LDM 140. It should be noted, though, that the LDM 140 may be invoked to perform any other type of remix or any other type of license management function. For example, the LDM 140 may be used to carry out a partial remix (i.e. remixing only a portion of the remainder of a license), to transfer a license to another licensing host, to transfer a set of licensed software to another software host, as well as other license management functions. Such other capabilities of the LDM 140 are within the scope of the present invention.

Hardware Overview

Figure 10:
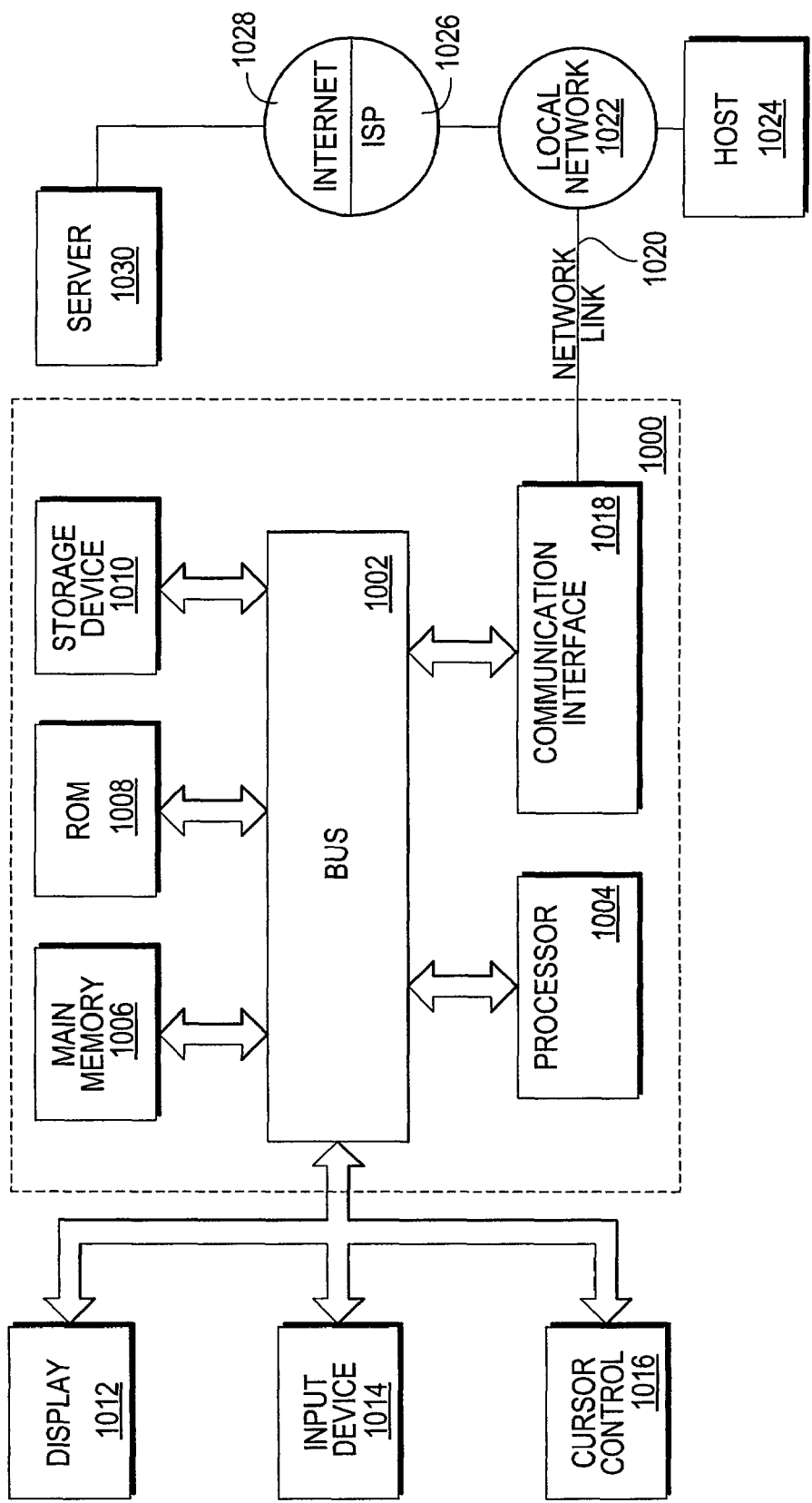
FIG. 10 is a hardware block diagram of a standard computer system.

In one embodiment, the various components (e.g. the CMM 130, the LDM 140, and the interface 120) of the present invention are implemented as a set of instructions executable by one or more processors. The invention may be implemented, for example, as part of an object oriented programming system. FIG. 10 shows a hardware block diagram of a computer system 1000 which may be used to implement each or a combination of the various components of the invention. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 may also be further used to store temporary variables or other intermediate information during execution of instructions by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

According to one embodiment, the functionality of the present invention is provided by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution. In this manner, computer system 1000 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A computer-implemented method for managing a contract, comprising:
   receiving, over a network, from a client computer that runs a browser program, a first inquiry regarding licensing of a first set of software under a particular contract;
   in response to receiving said first inquiry, accessing, at a management system that is coupled to said client computer via said network and is embodied in a machine, information pertaining to said particular contract, said information comprising a quota parameter, which specifies a quota of resources that can be consumed under said particular contract;
   determining, at said management system, a first licensing amount attributable to licensing said first set of software;
   updating said quota parameter at said management system based, at least partially, upon said first licensing amount;
   deploying, via said network, license management software to a licensing host;
   sending license parameters from said management system over said network to said licensing host that (a) is coupled to said management system via said network, (b) communicates with said first set of software over said network, and (c) enforces, via said license management software, said license parameters relative to said first set of software;
   deploying, via said network, said first set of software to a software host, the software host configured to execute said first set of software;
   allowing said first set of software to be used under said particular contract; and
   wherein said updating said quota parameter includes reducing said quota parameter by said first licensing amount;
   wherein the client computer, the management system, the licensing host and the software host represent a distinct computing device.

2. The method of claim 1, further comprising:
   receiving a second inquiry regarding licensing of a second set of software under said particular contract;
   determining a second licensing amount attributable to licensing said second set of software;
   updating said quota parameter based, at least partially, upon said second licensing amount; and
   allowing said second set of software to be used under said particular contract.

3. The method of claim 2, wherein said first set of software and said second set of software are different sets of software.

4. The method of claim 2, wherein said second set of software is an upgraded version of said first set of software.

5. The method of claim 1, further comprising:
   receiving a second inquiry regarding obtaining a service under said particular contract;
   determining a service amount attributable to obtaining said service;
   updating said quota parameter based, at least partially, upon said service amount; and
   allowing said service to be rendered under said particular contract.

6. The method of claim 5, wherein said service comprises technical support.

7. The method of claim 1, further comprising:
   receiving a second inquiry regarding purchasing a product under said particular contract;
   determining a purchasing amount attributable to purchasing said product;
   updating said quota parameter based, at least partially, upon said purchasing amount; and
   allowing said product to be purchased under said particular contract.

8. The method of claim 1, further comprising:
   receiving a second inquiry regarding licensing a set of property under said particular contract;
   determining a second licensing amount attributable to licensing said property;
   updating said quota parameter based, at least partially, upon said second licensing amount; and
   allowing said property to be used under said particular contract.

9. The method of claim 8, wherein said property comprises intellectual property.

10. The method of claim 8, wherein said property comprises proprietary information.

11. The method of claim 1, wherein said first inquiry specifies one or more additional inquiry parameters, and wherein said first licensing amount is determined based, at least partially, upon at least one of said one or more additional inquiry parameters.

12. The method of claim 11, wherein at least one of said one or more additional inquiry parameters is specifiable by a sender of said first inquiry.

13. The method of claim 11, wherein said one or more additional inquiry parameters comprises a parameter indicating a desired amount of time for which said first set of software is to be licensed.

14. The method of claim 11, wherein said one or more additional inquiry parameters comprises a parameter indicating how many users may concurrently use said first set of software.

15. The method of claim 11, wherein said one or more additional inquiry parameters comprises a parameter indicating how many copies of said first set of software are desired.

16. The method of claim 1, wherein allowing said first set of software to be used comprises:
granting a license to use said first set of software for a period of time.

17. The method of claim 16, further comprising:
receiving a request to terminate said license before said period of time has elapsed;
determining a refund amount; and
updating said quota parameter based, at least partially, upon said refund amount.

18. The method of claim 17, further comprising:
disallowing further use of said first set of software under said particular contract.

19. The method of claim 17, wherein updating said quota parameter comprises:
increasing said quota parameter by said refund amount.

20. The method of claim 17, wherein said refund amount is determined based, at least partially, upon an unused portion of said license.

21. The method of claim 1, wherein deploying said first set of software includes:
receiving a request to deploy said first set of software; and
deploying said first set of software to said software host, wherein said software host may be any host specified by a sender of said request.

22. A computer-implemented method for managing a contract, comprising:
receiving, over a network, from a client computer that runs a browser program, at a management system that is coupled to said client computer via said network and is embodied in a machine, a first inquiry regarding licensing of a first set of software under a particular contract;
in response to receiving said first inquiry at said management system, accessing, at said management system, information pertaining to said particular contract, said information comprising a quota parameter, which specifies a quota of resources that can be consumed under said particular contract, and one or more contract terms associated with said particular contract;
determining, at said management system, a first licensing amount attributable to licensing said first set of software, said first licensing amount determined, at least partially, by applying one or more of said contract terms;
updating said quota parameter at said management system based, at least partially, upon said first licensing amount;
deploying, via said network, license management software to a licensing host;
sending license parameters from said management system over said network to said licensing host that (a) is coupled to said management system via said network, (b) communicates with said first set of software over said network, and (c) enforces, via said license management software, said license terns parameters relative to said first set of software;
deploying, via said network, said first set of software to a software host, the software host configured to execute said first set of software;
allowing said first set of software to be used under said particular contract; and
wherein said updating said quota parameter includes reducing said quota parameter by said first licensing amount;
wherein the client computer, the management system, the licensing host and the software host represent a distinct computing device.

23. The method of claim 22, further comprising: receiving a second inquiry regarding licensing of a second set of software under said particular contract;
accessing said information pertaining to said particular contract;
determining a second licensing amount attributable to licensing said second set of software, said second licensing amount determined, at least partially, by applying one or more of said contract terms;
updating said quota parameter based, at least partially, upon said second licensing amount;
and allowing said second set of software to be used under said particular contract.

24. The method of claim 23, wherein said first set of software and said second set of software are different sets of software.

25. The method of claim 23, wherein said second set of software is an upgraded version of said first set of software.

26. The method of claim 23, wherein the one or more contract terms applied to determine said first licensing amount are different from the one or more contract terms applied to determine said second licensing amount.

27. The method of claim 23, wherein the one or more contract terms applied to determine said first licensing amount are the same as the one or more contract terms applied to determine said second licensing amount.

28. The method of claim 22, further comprising: receiving a second inquiry regarding obtaining a service under said particular contract;
determining a service amount attributable to obtaining said service;
updating said quota parameter based, at least partially, upon said service amount;
and allowing said service to be rendered under said particular contract.

29. The method of claim 28, wherein said service comprises technical support.

30. The method of claim 28, wherein said service amount is determined, at least partially, by applying one or more of said contract terms.

31. The method of claim 22, further comprising: receiving a second inquiry regarding purchasing a product under said particular contract;
determining a purchasing amount attributable to purchasing said product;

updating said quota parameter based, at least partially, upon said purchasing amount;

and allowing said product to be purchased under said particular contract.

32. The method of claim 31, wherein said purchasing amount is determined, at least partially, by applying one or more of said contract terms.

33. The method of claim 22, further comprising: receiving a second inquiry regarding licensing a set of property under said particular contract;

determining a second licensing amount attributable to licensing said property; updating said quota parameter based, at least partially, upon said second licensing amount;

and allowing said property to be used under said particular contract.

34. The method of claim 33, wherein said property comprises intellectual property.

35. The method of claim 33, wherein said property comprises proprietary information.

36. The method of claim 33, wherein said second licensing amount is determined, at least partially, by applying one or more of said contract terms.

37. The method of claim 22, wherein said one or more contract terms comprises an uplift.

38. The method of claim 22, wherein said one or more contract terms comprises a discount.

39. The method of claim 22, wherein said one or more contract terms comprises a multiplier.

40. The method of claim 22, wherein said first inquiry specifies one or more additional inquiry parameters, and wherein said first licensing amount is determined based, at least partially, upon at least one of said one or more additional inquiry parameters.

41. The method of claim 40, wherein at least one of said one or more additional inquiry parameters is specifiable by a sender of said first inquiry.

42. The method of claim 40, wherein said one or more additional inquiry parameters comprises a parameter indicating a desired amount of time for which said first set of software is to be licensed.

43. The method of claim 40, wherein said one or more additional inquiry parameters comprises a parameter indicating how many users may concurrently use said first set of software.

44. The method of claim 40, wherein said one or more additional inquiry parameters comprises a parameter indicating how many copies of said first set of software are desired.

45. The method of claim 22, wherein said first inquiry specifies a set of inquiry parameters, which include a reference to said first set of software and one or more additional inquiry parameters, and wherein determining said first licensing amount comprises:

determining, based at least partially upon one or more of said inquiry parameters, which of said one or more contract terms to apply to said first inquiry.

46. The method of claim 45, wherein said set of inquiry parameters comprises a parameter indicating a desired amount of time for which said first set of software is to be licensed.

47. The method of claim 22, wherein allowing said first set of software to be used comprises: granting a license to use said first set of software for a period of time.

48. The method of claim 47, further comprising: receiving a request to terminate said license before said period of time has elapsed; determining a refund amount; and updating said quota parameter based, at least partially, upon said refund amount.

49. The method of claim 47, further comprising: disallowing further use of said first set of software under said particular contract.

50. The method of claim 48, wherein updating said quota parameter based, at least partially, upon said refund amount comprises: increasing said quota parameter by said refund amount.

51. The method of claim 48, wherein said refund amount is determined based, at least partially, upon an unused portion of said license.

52. The method of claim 48, wherein said refund amount is determined, at least partially, by applying one or more of said contract terms.

53. The method of claim 22, wherein deploying said first set of software includes:

receiving a request to deploy said first set of software; and deploying said first set of software to said software host, wherein said software host may be any host specified by a sender of said request.

54. A computer-implemented method for managing a contract, comprising:

receiving, over a network, from a client computer that runs a browser program, at a management system is embodied in a machine that is coupled to said client computer via said network, an inquiry regarding licensing of a set of software under a particular contract;

in response to receiving said first inquiry at said management system, accessing, at said management system, a first set of information pertaining to said particular contract, said first set of information comprising a quota parameter, which specifies a quota of resources that can be consumed under said particular contract, and one or more contract terms associated with said particular contract;

accessing, at said management system, one or more other sets of information pertaining to one or more other contracts related to said particular contract, each of said other sets of information comprising one or more contract terms associated with one of said other contracts;

processing said first set of information and said one or more other sets of information at said management system to derive one or more applicable contract terms that apply to said inquiry;

determining, at said management system, a licensing amount attributable to licensing said set of software, said licensing amount determined, at least partially, by applying said one or more applicable contract terms;

updating said quota parameter at said management system based, at least partially, upon said licensing amount;

deploying, via said network, license management software to a licensing host;

sending license parameters from said management system over said network to said licensing host that (a) is embodied in a machine that is connected, via said network, to a machine in which said management system is embodied, (b) communicates with said first set of software over said network, and (c) enforces, via said license management software, said license parameters relative to said first set of software;

deploying, via said network, said set of software to a software host, the software host configured to execute said set of software;

allowing said first set of software to be used under said particular contract; and wherein said updating said quota parameter includes reducing said quota parameter by said first licensing amount;

wherein the client computer, the management system, the licensing host and the software host represent a distinct computing device.

55. The method of claim 54, wherein said one or more applicable contract terms may be derived from said first set of information or from any of said one or more other sets of information.

56. The method of claim 54, wherein the contract terms associated with each contract may differ, and wherein processing said first set of information and said one or more other sets of information comprises:

reconciling said first set of information and said one or more other sets of information to extract therefrom said one or more applicable contract terms.

57. The method of claim 56, wherein reconciling comprises:

processing said first set of information and said one or more other sets of information in a particular order; searching, as each set of information is processed, for a contract term that applies to said inquiry; and upon finding a first contract term that applies to said inquiry, including said first contract term as one of said one or more applicable contract terms.

58. The method of claim 57, wherein said first contract term may be found in said first set of information, or in any of said one or more other sets of information.

59. The method of claim 54, wherein processing said first set of information and said one or more other sets of information comprises:

determining whether said first set of information comprises a contract term that applies to said inquiry; and in response to a determination that said first set of information does not comprise a contract term that applies to said inquiry, deriving said one or more applicable contract terms from said one or more other sets of information.

60. The method of claim 59, wherein deriving said one or more applicable contract terms further comprises:

in response to a determination that said first set of information does comprise a contract term that applies to said inquiry, including the contract term that applies to said inquiry as one of said one or more applicable contract terms.

61. The method of claim 54, wherein processing said first set of information and said one or more other sets of information comprises:

processing said first set of information and said one or more other sets of information in a particular order;

searching, as each set of information is processed, for a contract term that applies to said inquiry; and upon finding a contract term that applies to said inquiry, including the contract term that applies to said inquiry as one of said one or more applicable contract terms.

62. The method of claim 61, wherein the contract term that applies to said inquiry may be found in said first set of information, or in any of said one or more other sets of information.

63. A computer-implemented method for managing a contract, comprising:

receiving, over a network, from a client computer that runs a browser program, at a management system is embodied in a machine that is coupled to said client computer via said network, a request to terminate a license on a set of software, said set of software being deployed on a software host configured to execute said set of software;

in response to receiving said request at said management system, accessing information pertaining to said license, said information comprising a reference to a contract under which said license was granted, said contract having a quota parameter associated therewith which specifies a quota of resources that can be consumed under said contract;

determining a refund amount at said management system;

updating said quota parameter at said management system based, at least partially, upon said refund amount;

deploying, via said network, license management software to a licensing host;

sending license parameters from said management system over said network to said licensing host that (a) is embodied in a machine that is connected, via said network, to a machine in which said management system is embodied, (b) communicates with said set of software over said network, and (c) enforces, via said license management software, said license parameters relative to said set of software;

disallowing further use of said set of software under said contract; and wherein said updating said quota parameter includes reducing said quota parameter by said first licensing amount;

wherein the client computer, the management system, the licensing host and the software host represent a distinct computing device.

64. The method of claim 63, wherein updating said quota parameter comprises:

increasing said quota parameter by said refund amount.

65. The method of claim 63, wherein said contract has one or more contract terms associated therewith, and wherein said refund amount is determined, at least partially, by applying one or more of said contract terms.

66. The method of claim 64, wherein said information pertaining to said license further comprises a licensing amount attributable to licensing said set of software, and wherein said refund amount is determined based, at least partially, upon said licensing amount.

67. The method of claim 66, wherein said refund amount is a portion of said licensing amount, and wherein said portion is proportional to an unused portion of said license.

68. The method of claim 63, wherein disallowing further use of said set of software comprises: preventing further execution of said set of software.

69. The method of claim 68, wherein preventing comprises:

invalidating an authorization parameter which is required for proper execution of said set of software.

70. A non-transitory computer readable medium comprising instructions which, when executed by one or more processors, cause the one or more processors to manage a contract, said computer readable medium comprising:

instructions for causing one or more processors to receive, over a network, from a client computer that runs a browser program, a first inquiry regarding licensing of a first set of software under a particular contract;

instructions for causing one or more processors to access, in response to receipt of said first inquiry and at a management system that is coupled to said client computer via said network, information pertaining to said particular contract, said information comprising a quota parameter, which specifies a quota of resources that can be consumed under said particular contract;

instructions for causing one or more processors to determine, at said management system, a first licensing amount attributable to licensing said first set of software;
instructions for causing one or more processors to update said quota parameter at said management system based, at least partially, upon said first licensing amount;
instructions for deploying, via said network, license management software to a licensing host;
instructions for causing one or more processors to send license parameters from said management system over said network to said licensing host that (a) is coupled to said management system via said network, (b) communicates with said first set of software over said network, and (c) enforces, via said license management software, said license parameters relative to said first set of software;
instructions for deploying, via said network, said first set of software to a software host, the software host configured to execute said first set of software;
instructions for causing one or more processors to allow said first set of software to be used under said particular contract; and
wherein said instructions for causing one or more processors to update said quota parameter include instructions for reducing said quota parameter by said first licensing amount;
wherein the client computer, the management system, the licensing host and the software host represent a distinct computing device.

71. The computer readable medium of claim 70, further comprising:
instructions for causing one or more processors to receive a second inquiry regarding licensing of a second set of software under said particular contract;
instructions for causing one or more processors to determine a second licensing amount attributable to licensing said second set of software;
instructions for causing one or more processors to update said quota parameter based, at least partially, upon said second licensing amount; and
instructions for causing one or more processors to allow said second set of software to be used under said particular contract.

72. The computer readable medium of claim 71, wherein said first set of software and said second set of software are different sets of software.

73. The computer readable medium of claim 71, wherein said second set of software is an upgraded version of said first set of software.

74. The computer readable medium of claim 70, further comprising:
instructions for causing one or more processors to receive a second inquiry regarding obtaining a service under said particular contract;
instructions for causing one or more processors to determine a service amount attributable to obtaining said service;
instructions for causing one or more processors to update said quota parameter based, at least partially, upon said service amount; and
instructions for causing one or more processors to allow said service to be rendered under said particular contract.

75. The computer readable medium of claim 74, wherein said service comprises technical support.

76. The computer readable medium of claim 70, further comprising:

instructions for causing one or more processors to receive a second inquiry regarding purchasing a product under said particular contract;
instructions for causing one or more processors to determine a purchasing amount attributable to purchasing said product;
instructions for causing one or more processors to update said quota parameter based, at least partially, upon said purchasing amount; and
instructions for causing one or more processors to allow said product to be purchased under said particular contract.

77. The computer readable medium of claim 70, further comprising:
instructions for causing one or more processors to receive a second inquiry regarding licensing a set of property under said particular contract;
instructions for causing one or more processors to determine a second licensing amount attributable to licensing said property;
instructions for causing one or more processors to update said quota parameter, based, at least partially, upon said second licensing amount; and
instructions for causing one or more processors to allow said property to be used under said particular contract.

78. The computer readable medium of claim 77, wherein said property comprises intellectual property.

79. The computer readable medium of claim 77, wherein said property comprises proprietary information.

80. The computer readable medium of claim 70, wherein said instructions for causing one or more processors to update said quota parameter comprises:
instructions for causing one or more processors to reduce said quota parameter by said first licensing amount.

81. The computer readable medium of claim 70, wherein said first inquiry specifies one or more additional inquiry parameters, and wherein said first licensing amount is determined based, at least partially, upon at least one of said one or more additional inquiry parameters.

82. The computer readable medium of claim 81, wherein at least one of said one or more additional inquiry parameters is specifiable by a sender of said first inquiry.

83. The computer readable medium of claim 81, wherein said one or more additional inquiry parameters comprises a parameter indicating a desired amount of time for which said first set of software is to be licensed.

84. The computer readable medium of claim 81, wherein said one or more additional inquiry parameters comprises a parameter indicating how many users may concurrently use said first set of software.

85. The computer readable medium of claim 81, wherein said one or more additional inquiry parameters comprises a parameter indicating how many copies of said first set of software are desired.

86. The computer readable medium of claim 70, wherein said instructions for causing one or more processors to allow said first set of software to be used comprises:
instructions for causing one or more processors to grant a license to use said first set of software for a period of time.

87. The computer readable medium of claim 86, further comprising:
instructions for causing one or more processors to receive a request to terminate said license before said period of time has elapsed;
instructions for causing one or more processors to determine a refund amount; and instructions for causing one or more processors to update said quota parameter based, at least partially, upon said refund amount.

88. The computer readable medium of claim 87, further comprising:
instructions for causing one or more processors to disallow further use of said first set of software under said particular contract.

89. The computer readable medium of claim 87, wherein said instructions for causing one or more processors to update said quota parameter comprises:
instructions for causing one or more processors to increase said quota parameter by said refund amount.

90. The computer readable medium of claim 87, wherein said refund amount is determined based, at least partially, upon an unused portion of said license.

91. The computer readable medium of claim 70, wherein the instructions for deploying the first set of software includes:
instructions for causing one or more processors to receive a request to deploy said first set of software; and
instructions for causing one or more processors to deploy said first set of software to said software host, wherein said software host may be any host specified by a sender of said request.

92. A non-transitory computer readable medium comprising instructions which, when executed by one or more processors, cause the one or more processors to manage a contract, said computer readable medium comprising:
instructions for causing one or more processors to receive, over a network, from a client computer that runs a browser program, at a management system that is coupled to said client computer via said network, a first inquiry regarding licensing of a first set of software under a particular contract;
instructions for causing one or more processors to access, at said management system and in response to receipt of said first inquiry at said management system, information pertaining to said particular contract, said information comprising a quota parameter, which specifies a quota of resources that can be consumed under said particular contract, and one or more contract terms associated with said particular contract;
instructions for causing one or more processors to determine, at said management system, a first licensing amount attributable to licensing said first set of software, said first licensing amount determined, at least partially, by applying one or more of said contract terms;
instructions for causing one or more processors to update said quota parameter at said management system based, at least partially, upon said first licensing amount;
instructions for deploying, via said network, license management software to a licensing host;
instructions for causing one or more processors to send license parameters from said management system over said network to said licensing host that (a) is coupled to said management system via said network, (b) communicates with said first set of software over said network, and (c) enforces, via said license management software, said license parameters relative to said first set of software; and
instructions for deploying, via said network, said first set of software to a software host, the software host configured to execute said first set of software;
instructions for causing one or more processors to allow said first set of software to be used under said particular contract; and
wherein said instructions for causing one or more processors to update said quota parameter include instructions for reducing said quota parameter by said first licensing amount;
wherein the client computer, the management system, the licensing host and the software host represent a distinct computing device.

93. The computer readable medium of claim 92, further comprising:
instructions for causing one or more processors to receive a second inquiry regarding licensing of a second set of software under said particular contract;
instructions for causing one or more processors to access said information pertaining to said particular contract;
instructions for causing one or more processors to determine a second licensing amount attributable to licensing said second set of software, said second licensing amount determined, at least partially, by applying one or more of said contract terms;
instructions for causing one or more processors to update said quota parameter based, at least partially, upon said second licensing amount; and
instructions for causing one or more processors to allow said second set of software to be used under said particular contract.

94. The computer readable medium of claim 93, wherein said first set of software and said second set of software are different sets of software.

95. The computer readable medium of claim 93, wherein said second set of software is an upgraded version of said first set of software.

96. The computer readable medium of claim 93, wherein the one or more contract terms applied to determine said first licensing amount are different from the one or more contract terms applied to determine said second licensing amount.

97. The computer readable medium of claim 93, wherein the one or more contract terms applied to determine said first licensing amount are the same as the one or more contract terms applied to determine said second licensing amount.

98. The computer readable medium of claim 92, further comprising:
instructions for causing one or more processors to receive a second inquiry regarding obtaining a service under said particular contract;
instructions for causing one or more processors to determine a service amount attributable to obtaining said service;
instructions for causing one or more processors to update said quota parameter based, at least partially, upon said service amount; and
instructions for causing one or more processors to allow said service to be rendered under said particular contract.

99. The computer readable medium of claim 98, wherein said service comprises technical support.

100. The computer readable medium of claim 98, wherein said service amount is determined, at least partially, by applying one or more of said contract terms.

101. The computer readable medium of claim 92, further comprising:
instructions for causing one or more processors to receive a second inquiry regarding purchasing a product under said particular contract;
instructions for causing one or more processors to determine a purchasing amount attributable to purchasing said product;

instructions for causing one or more processors to update said quota parameter based, at least partially, upon said purchasing amount; and instructions for causing one or more processors to allow said product to be purchased under said particular contract.

102. The computer readable medium of claim 101, wherein said purchasing amount is determined, at least partially, by applying one or more of said contract terms.

103. The computer readable medium of claim 92, further comprising:

instructions for causing one or more processors to receive a second inquiry regarding licensing a set of property under said particular contract;

instructions for causing one or more processors to determine a second licensing amount attributable to licensing said property;

instructions for causing one or more processors to update said quota parameter based, at least partially, upon said second licensing amount; and instructions for causing one or more processors to allow said property to be used under said particular contract.

104. The computer readable medium of claim 103, wherein said property comprises intellectual property.

105. The computer readable medium of claim 103, wherein said property comprises proprietary information.

106. The computer readable medium of claim 103, wherein said second licensing amount is determined, at least partially, by applying one or more of said contract terms.

107. The computer readable medium of claim 92, wherein said one or more contract terms comprises an uplift.

108. The computer readable medium of claim 92, wherein said one or more contract terms comprises a discount.

109. The computer readable medium of claim 92, wherein said one or more contract terms comprises a multiplier.

110. The computer readable medium of claim 92, wherein said instructions for causing one or more processors to update said quota parameter comprises:

instructions for causing one or more processors to reduce said quota parameter by said first licensing amount.

111. The computer readable medium of claim 92, wherein said first inquiry specifies one or more additional inquiry parameters, and wherein said first licensing amount is determined based, at least partially, upon at least one of said one or more additional inquiry parameters.

112. The computer readable medium of claim 111, wherein at least one of said one or more additional inquiry parameters is specifiable by a sender of said first inquiry.

113. The computer readable medium of claim 111, wherein said one or more additional inquiry parameters comprises a parameter indicating a desired amount of time for which said first set of software is to be licensed.

114. The computer readable medium of claim 111, wherein said one or more additional inquiry parameters comprises a parameter indicating how many users may concurrently use said first set of software.

115. The computer readable medium of claim 111, wherein said one or more additional inquiry parameters comprises a parameter indicating how many copies of said first set of software are desired.

116. The computer readable medium of claim 92, wherein said first inquiry specifies a set of inquiry parameters, which include a reference to said first set of software and one or more additional inquiry parameters, and wherein said instructions for causing one or more processors to determine said first licensing amount comprises:

instructions for causing one or more processors to determine, based at least partially upon one or more of said inquiry parameters, which of said one or more contract terms to, apply to said first inquiry.

117. The computer readable medium of claim 116, wherein said set of inquiry parameters comprises a parameter indicating a desired amount of time for which said first set of software is to be licensed.

118. The computer readable medium of claim 92, wherein said instructions for causing one or more processors to allow said first set of software to be used comprises:

instructions for causing one or more processors to grant a license to use said first set of software for a period of time.

119. The computer readable medium of claim 118, further comprising:

instructions for causing one or more processors to receive a request to terminate said license before said period of time has elapsed;

instructions for causing one or more processors to determine a refund amount; and instructions for causing one or more processors to update said quota parameter based, at least partially, upon said refund amount.

120. The computer readable medium of claim 118, further comprising:

instructions for causing one or more processors to disallow further use of said first set of software under said particular contract.

121. The computer readable medium of claim 119, wherein said instructions for causing one or more processors to update said quota parameter based, at least partially, upon said refund amount comprises:

instructions for causing one or more processors to increase said quota parameter by said refund amount.

122. The computer readable medium of claim 119, wherein said refund amount is determined based, at least partially, upon an unused portion of said license.

123. The computer readable medium of claim 119, wherein said refund amount is determined, at least partially, by applying one or more of said contract terms.

124. The computer readable medium of claim 92, wherein the instructions for deploying said first set of software include:

instructions for causing one or more processors to receive a request to deploy said first set of software; and instructions for causing one or more processors to deploy said first set of software to said software host, wherein said software host may be any host specified by a sender of said request.

125. A non-transitory computer readable medium comprising instructions which, when executed by one or more processors, cause the one or more processors to manage a contract, said computer readable medium comprising:

instructions for causing one or more processors to receive, over a network, from a client computer that runs a browser program, at a management system that is coupled to said client computer via said network, an inquiry regarding licensing of a set of software under a particular contract;

instructions for causing one or more processors to access, at said management system and in response to receipt of said first inquiry at said management system, a first set of information pertaining to said particular contract, said first set of information comprising a quota parameter, which specifies a quota of resources that can be consumed under said particular contract, and one or more contract terms associated with said particular contract;

instructions for causing one or more processors to access, at said management system, one or more other sets of information pertaining to one or more other contracts related to said particular contract, each of said other sets of information comprising one or more contract terms associated with one of said other contracts;

instructions for causing one or more processors to process said first set of information and said one or more other sets of information at said management system to derive one or more applicable contract terms, that apply to said inquiry;

instructions for causing one or more processors to determine, at said management system, a licensing amount attributable to licensing said set of software, said licensing amount determined, at least partially, by applying said one or more applicable contract terms;

instructions for causing one or more processors to update said quota parameter at said management system based, at least partially, upon said licensing amount;

instructions for deploying, via said network, license management software to a licensing host;

instructions for causing one or more processors to send license parameters from said management system over said network to said licensing host that (a) is embodied in a machine that is connected, via said network, to a machine in which said management system is embodied, (b) communicates with said first set of software over said network, and (c) enforces, via said license management software, said license terns-parameters relative to said first set of software;

instructions for deploying, via said network, said set of software to a software host, the software host configured to execute said set of software;

instructions for causing one or more processors to allow said first set of software to be used under said particular contract; and wherein said instructions for causing one or more processors to update said quota parameter include instructions for reducing said quota parameter by said first licensing amount;

wherein the client computer, the management system, the licensing host and the software host represent a distinct computing device.

126. The computer readable medium of claim 125, wherein said one or more applicable contract terms may be derived from said first set of information or from any of said one or more other sets of information.

127. The computer readable medium of claim 125, wherein the contract terms associated with each contract may differ, and wherein said instructions for causing one or more processors to process said first set of information and said one or more other sets of information comprises:
instructions for causing one or more processors to reconcile said first set of information and said one or more other sets of information to extract therefrom said one or more applicable contract terms.

128. The computer readable medium of claim 127, wherein said instructions for causing one or more processors to reconcile comprises:
instructions for causing one or more processors to process said first set of information and said one or more other sets of information in a particular order;
instructions for causing one or more processors to search, as each set of information is processed, for a contract term that applies to said inquiry; and instructions for causing one or more processors to, upon finding a first contract term that applies to said inquiry, include said first contract term as one of said one or more applicable contract terms.

129. The computer readable medium of claim 128, wherein said first contract term may be found in said first set of information, or in any of said one or more other sets of information.

130. The computer readable medium of claim 125, wherein said instructions for causing one or more processors to process said first set of information and said one or more other sets of information comprises:
instructions for causing one or more processors to determine whether said first set of information comprises a contract term that applies to said inquiry; and
instructions for causing one or more processors to, in response to a determination that said first set of information does not comprise a contract term that applies to said inquiry, derive said one or more applicable contract terms from said one or more other sets of information.

131. The computer readable medium of claim 130, wherein said instructions for causing one or more processors to derive said one or more applicable contract terms further comprises:
instructions for causing one or more processors to, in response to a determination that said first set of information does comprise a contract term that applies to said inquiry, include the contract term that applies to said inquiry as one of said one or more applicable contract terms.

132. The computer readable medium of claim 125, wherein said instructions for causing one or more processors to process said first set of information and said one or more other sets of information comprises:
instructions for causing one or more processors to process said first set of information and said one or more other sets of information in a particular order; instructions for causing one or more processors to search, as each set of information is processed, for a contract term that applies to said inquiry; and
instructions for causing one or more processors to, upon finding a contract term that applies to said inquiry, include the contract term that applies to said inquiry as one of said one or more applicable contract terms.

133. The computer readable medium of claim 132, wherein the contract term that applies to said inquiry may be found in said first set of information, or in any of said one or more other sets of information.

134. A non-transitory computer readable medium comprising instructions which, when executed by one or more processors, cause the one or more processors to manage a contract, said computer readable medium comprising:
instructions for causing one or more processors to receive, over a network, from a client computer that runs a browser program, at a management system that is embodied in a machine that is coupled to said client computer via said network, a request to terminate a license on a set of software, said set of software deployed on a software host configured to execute said set of software;
instructions for causing one or more processors to access, in response to receipt of said request at said management system, information pertaining to said license, said information comprising a reference to a contract under which said license was granted, said contract having a quota parameter associated therewith which specifies a quota of resources that can be consumed under said contract;

instructions for causing one or more processors to determine a refund amount at said management system;
instructions for causing one or more processors to update said quota parameter at said management system based, at least partially, upon said refund amount;
instructions for deploying, via said network, license management software to a licensing host;
instructions for causing one or more processors to send license parameters from said management system over said network to said licensing host that (a) is embodied in a machine that is connected, via said network, to a machine in which said management system is embodied, (b) communicates with said set of software over said network, and (c) enforces, via said license management software, said license parameters relative to said set of software;
instructions for causing one or more processors to disallow further use of said set of software under said contract; and
wherein said instructions for causing one or more processors to update said quota parameter include instructions for reducing said quota parameter by said first licensing amount;
wherein the client computer, the management system, the licensing host and the software host represent a distinct computing device.

135. The computer readable medium of claim 134, wherein said instructions for causing one or more processors to update said quota parameter comprises:
instructions for causing one or more processors to increase said quota parameter by said refund amount.

136. The computer readable medium of claim 134, wherein said contract has one or more contract terms associated therewith, and wherein said refund amount is determined, at least partially, by applying one or more of said contract terms.

137. The computer readable medium of claim 135, wherein said information pertaining to said license further comprises a licensing amount attributable to licensing said set of software, and wherein said refund amount is determined based, at least partially, upon said licensing amount.

138. The computer readable medium of claim 137, wherein said refund amount is a portion of said licensing amount, and wherein said portion is proportional to an unused portion of said license.

139. The computer readable medium of claim 134, wherein said instructions for causing one or more processors to disallow further use of said set of software comprises:
instructions for causing one or more processors to prevent further execution of said set of software.

140. The computer readable medium of claim 139, wherein said instructions for causing one or more processors to prevent comprises:
instructions for causing one or more processors to invalidate an authorization parameter which is required for proper execution of said set of software.

* * * * *